July 9, 1963
E. A. VERRINDER ET AL
3,096,891
APPARATUS FOR HANDLING CASES
Original Filed July 11, 1955
23 Sheets-Sheet 1
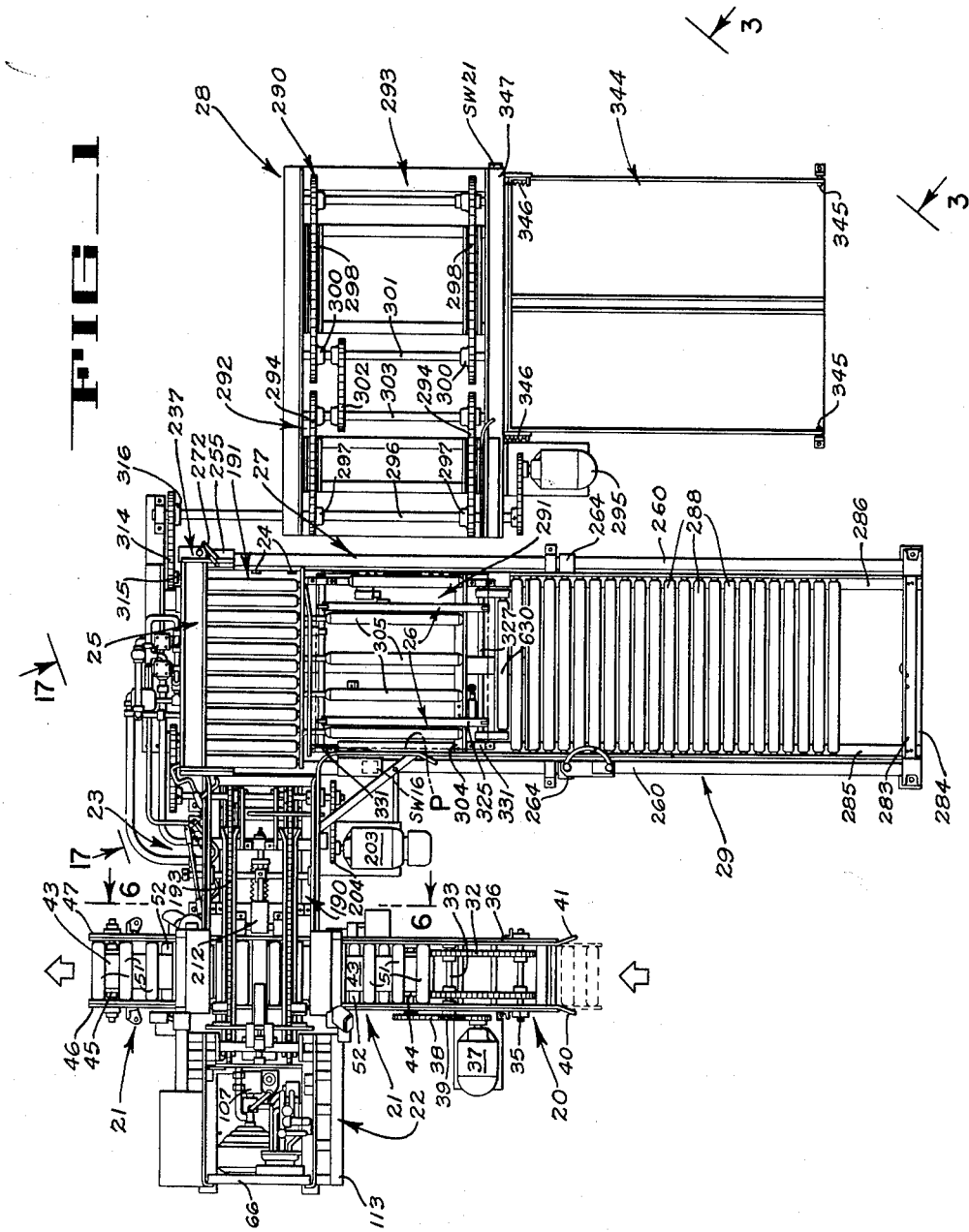
INVENTORS
ERNEST A. VERRINDER
EARLE J. McGRATH
BY Hans G. Hoffmeister
ATTORNEY

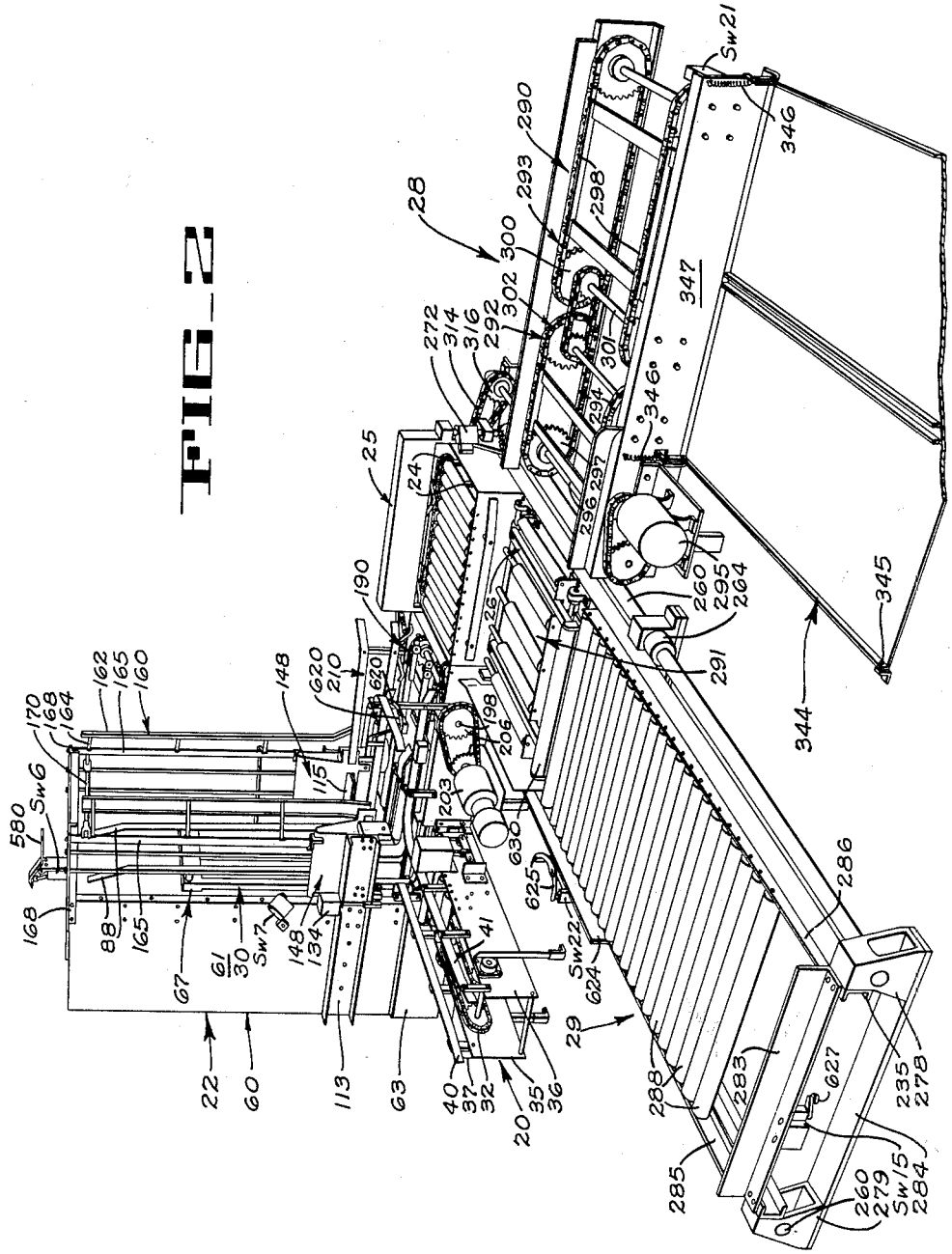

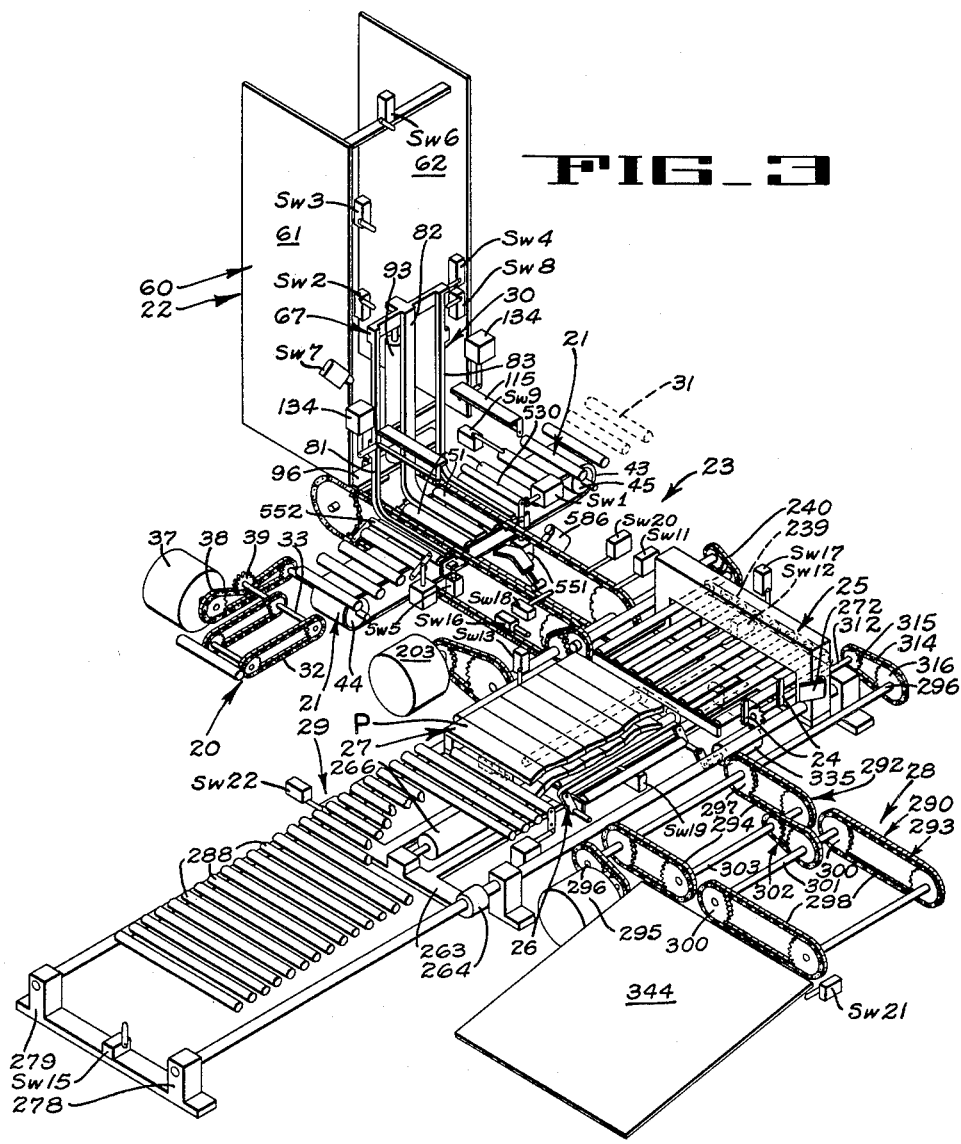

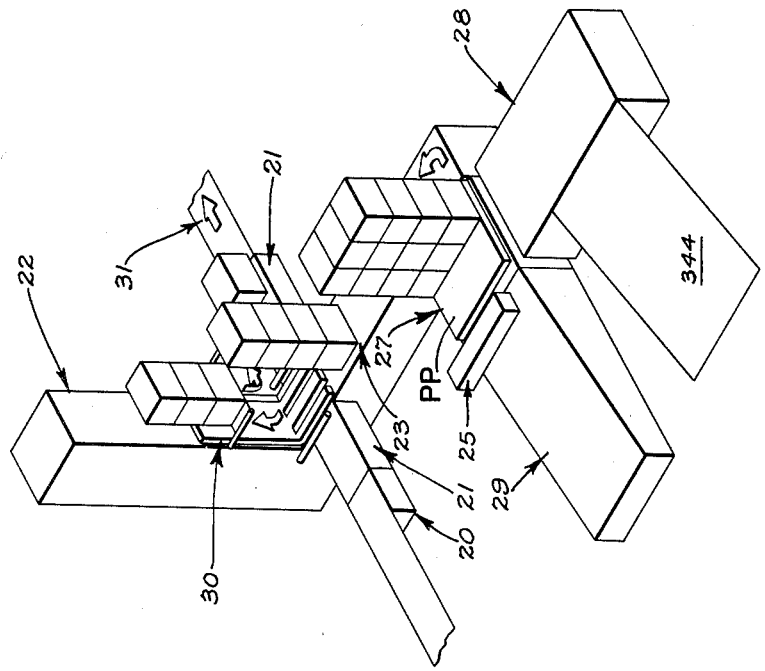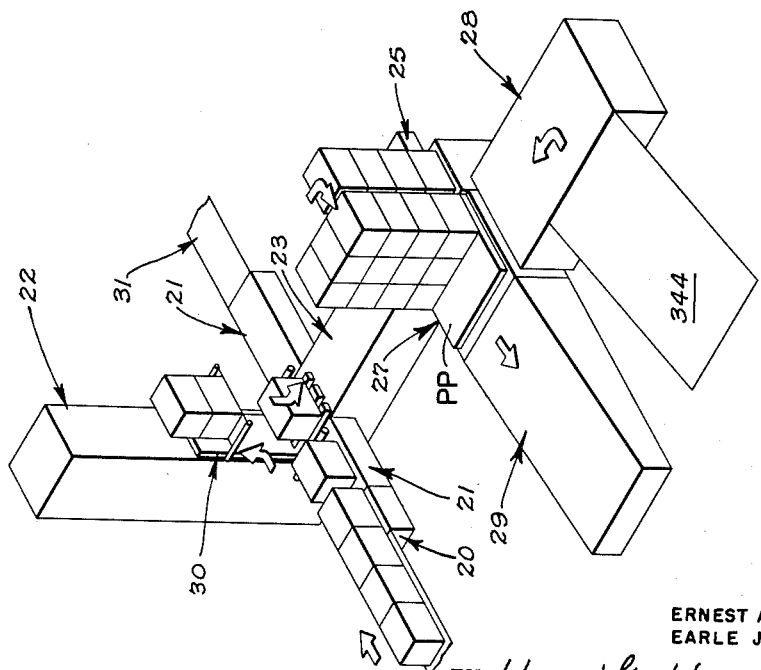

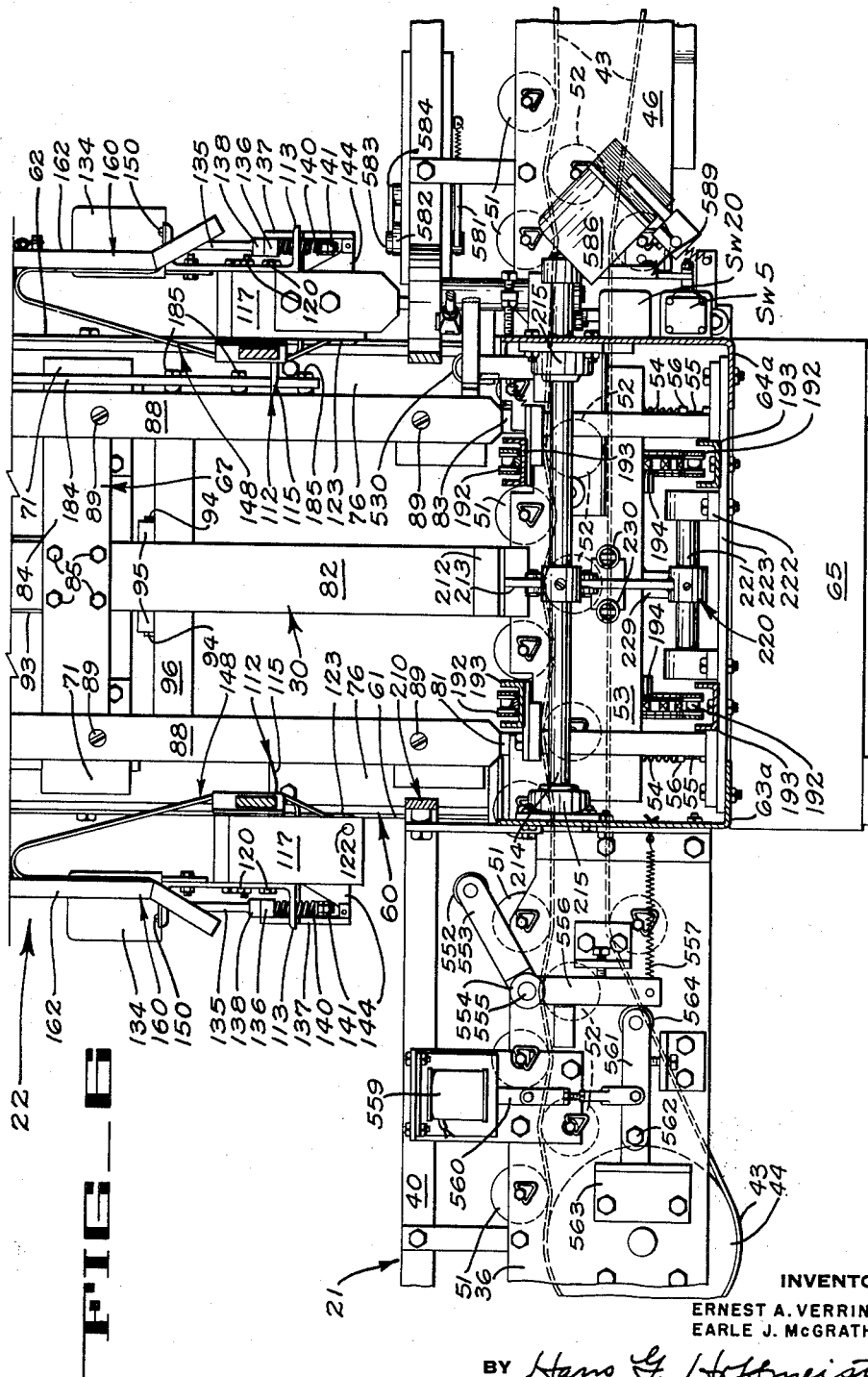

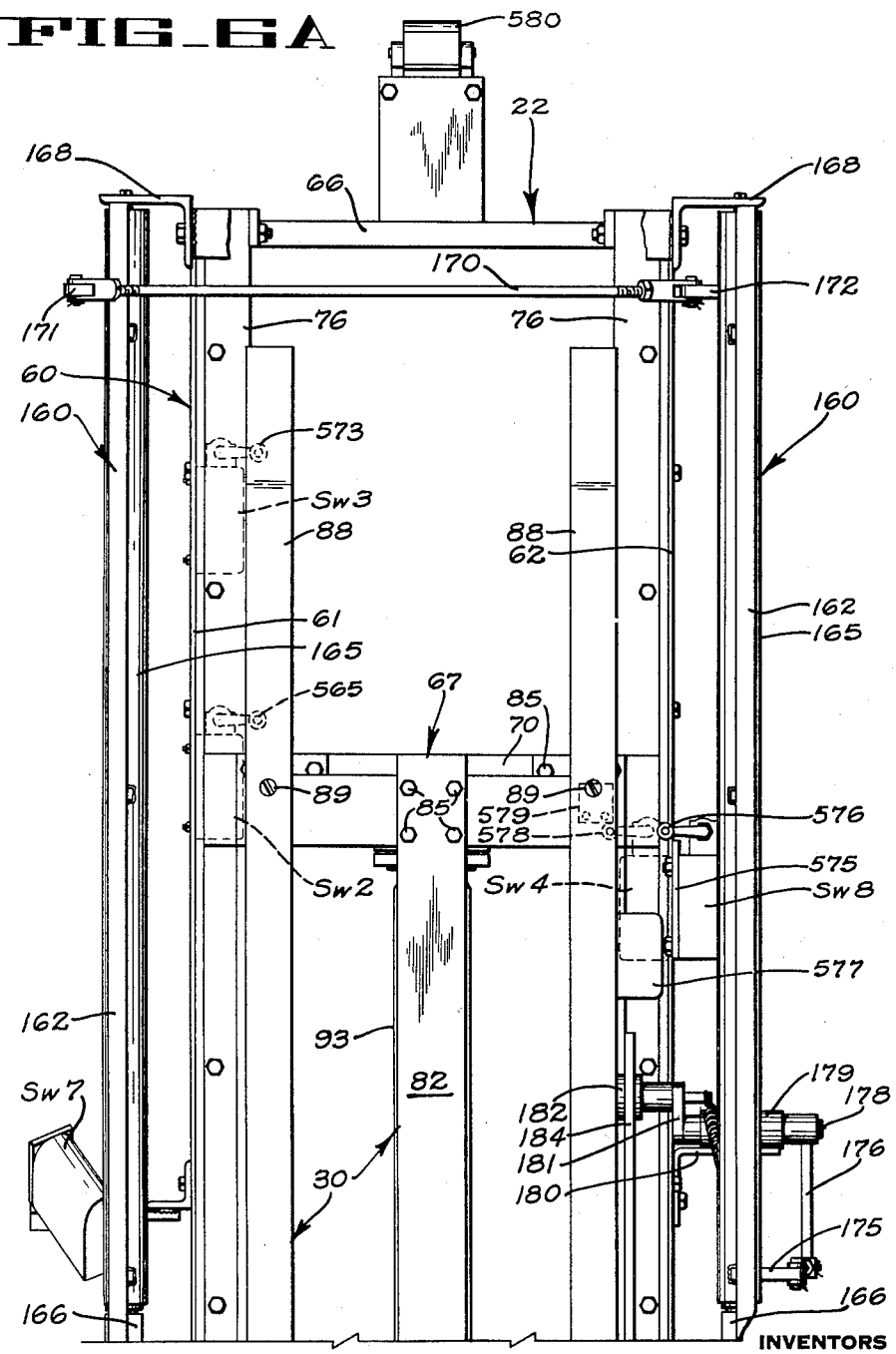

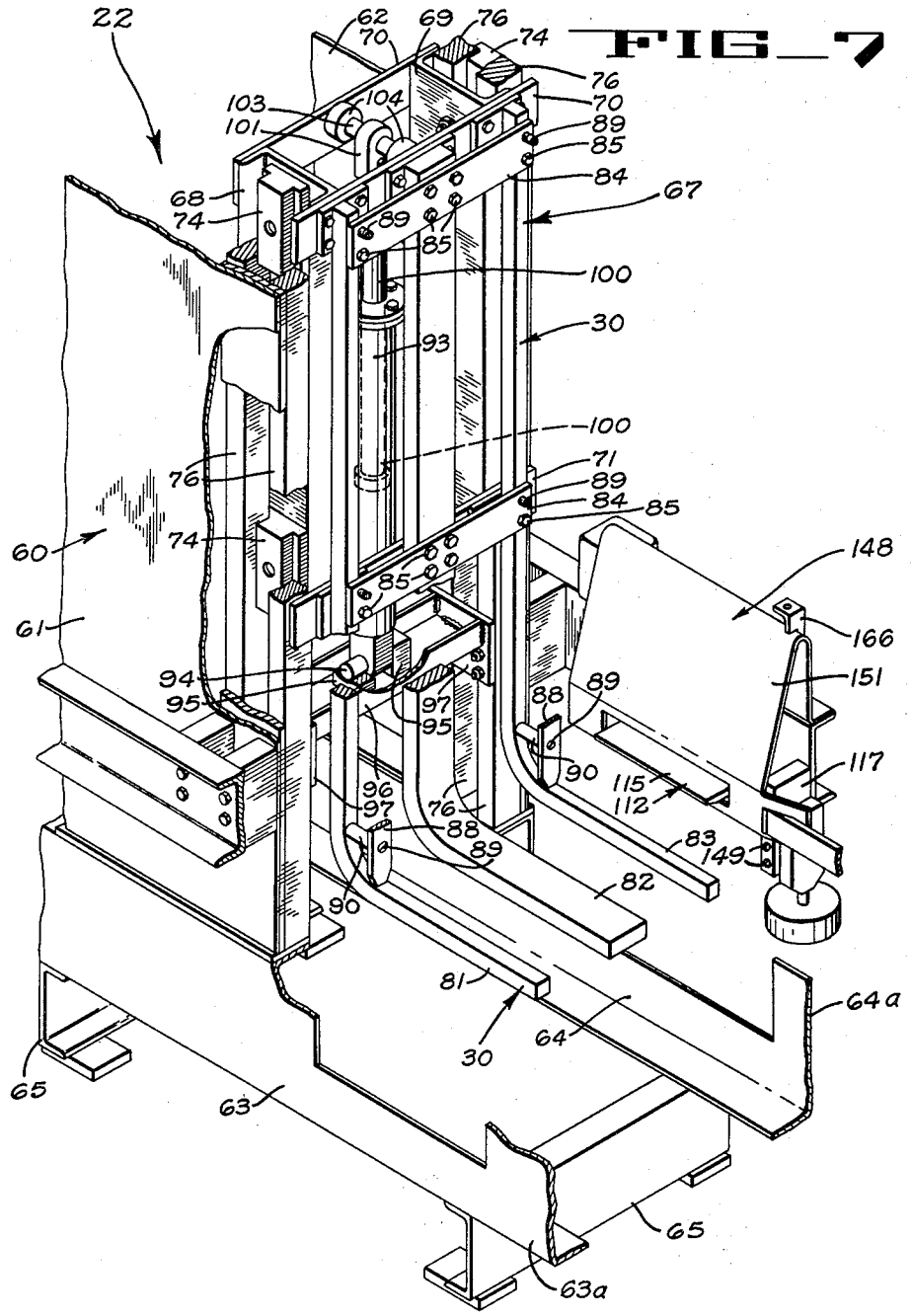

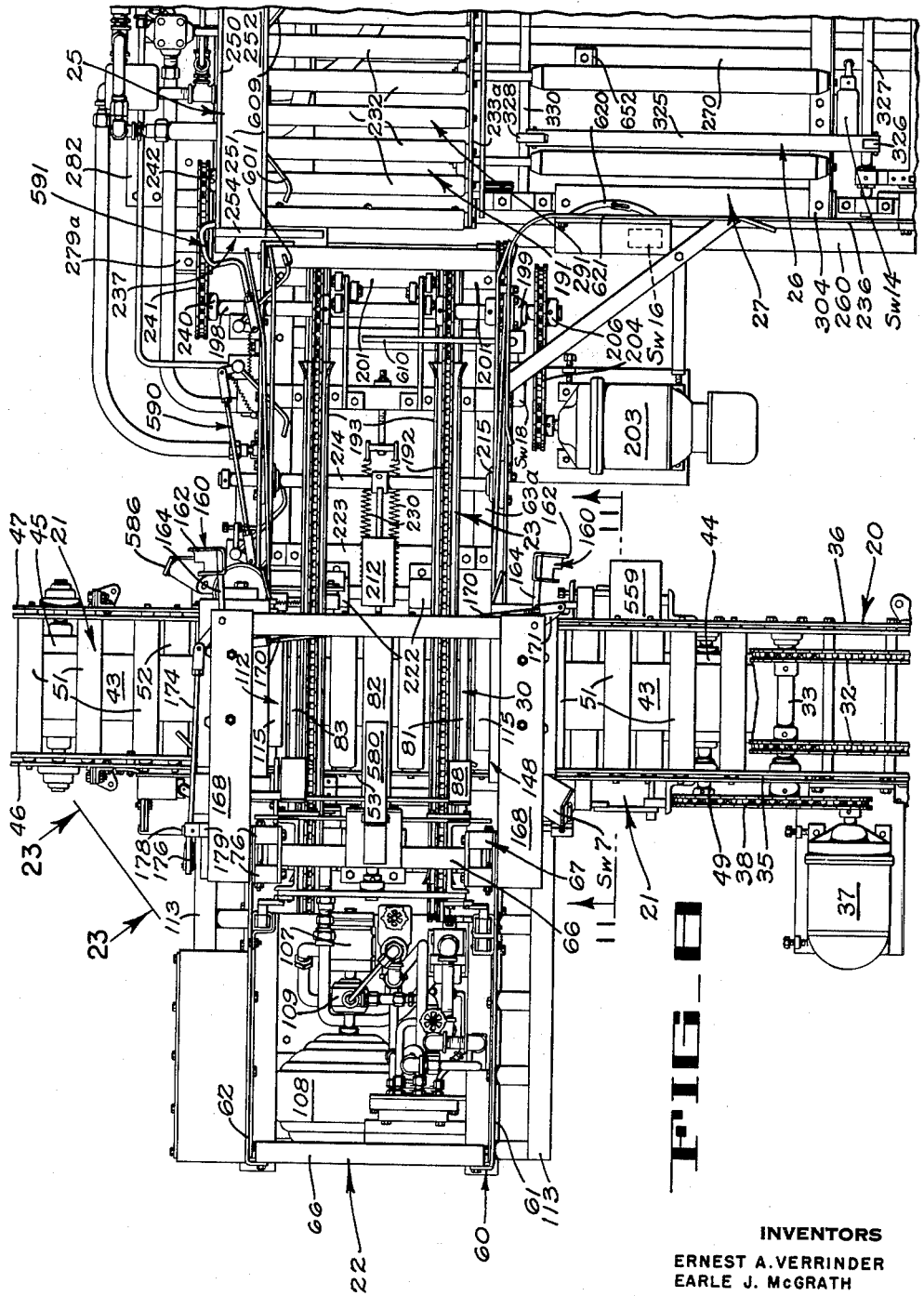
FIG_8

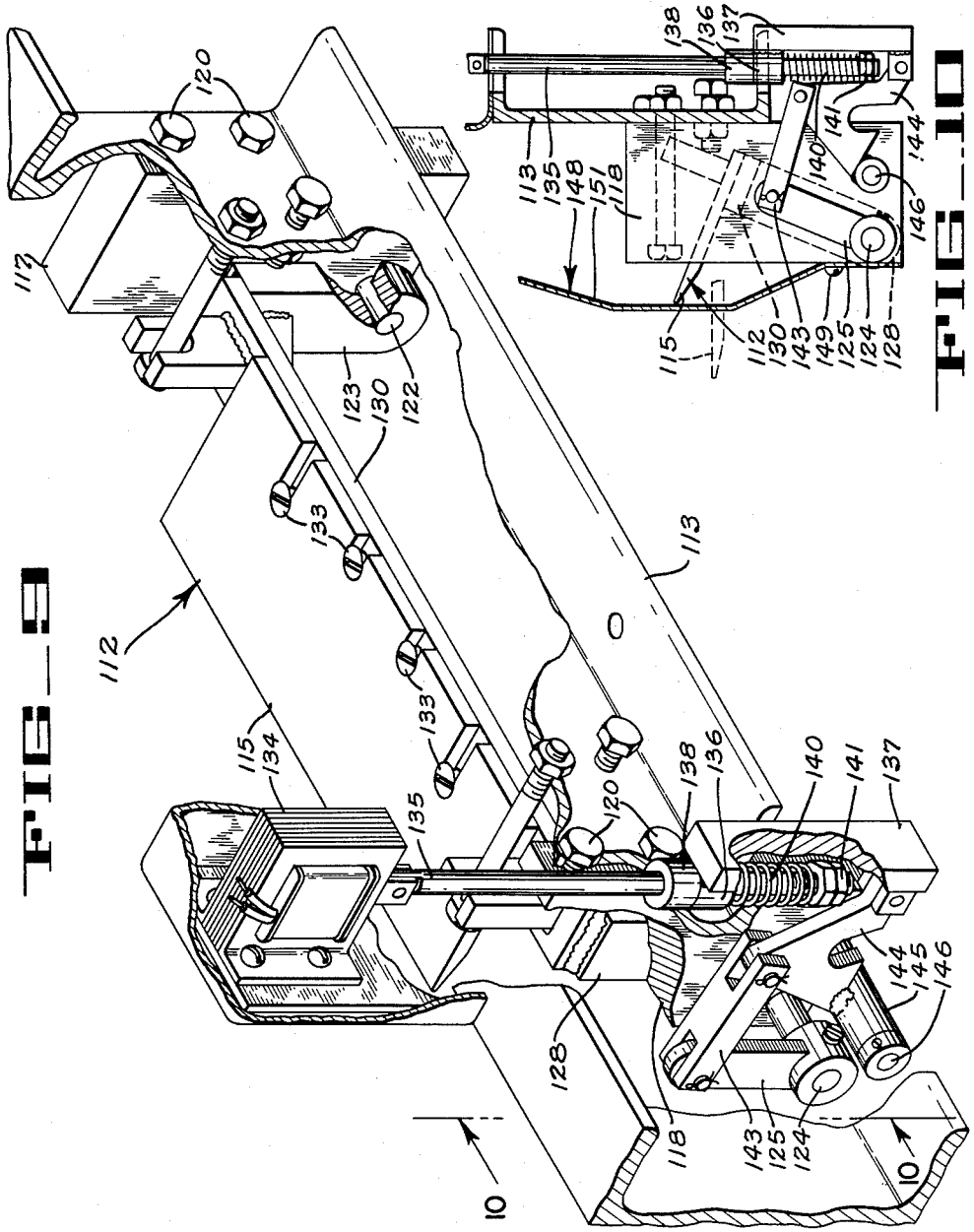

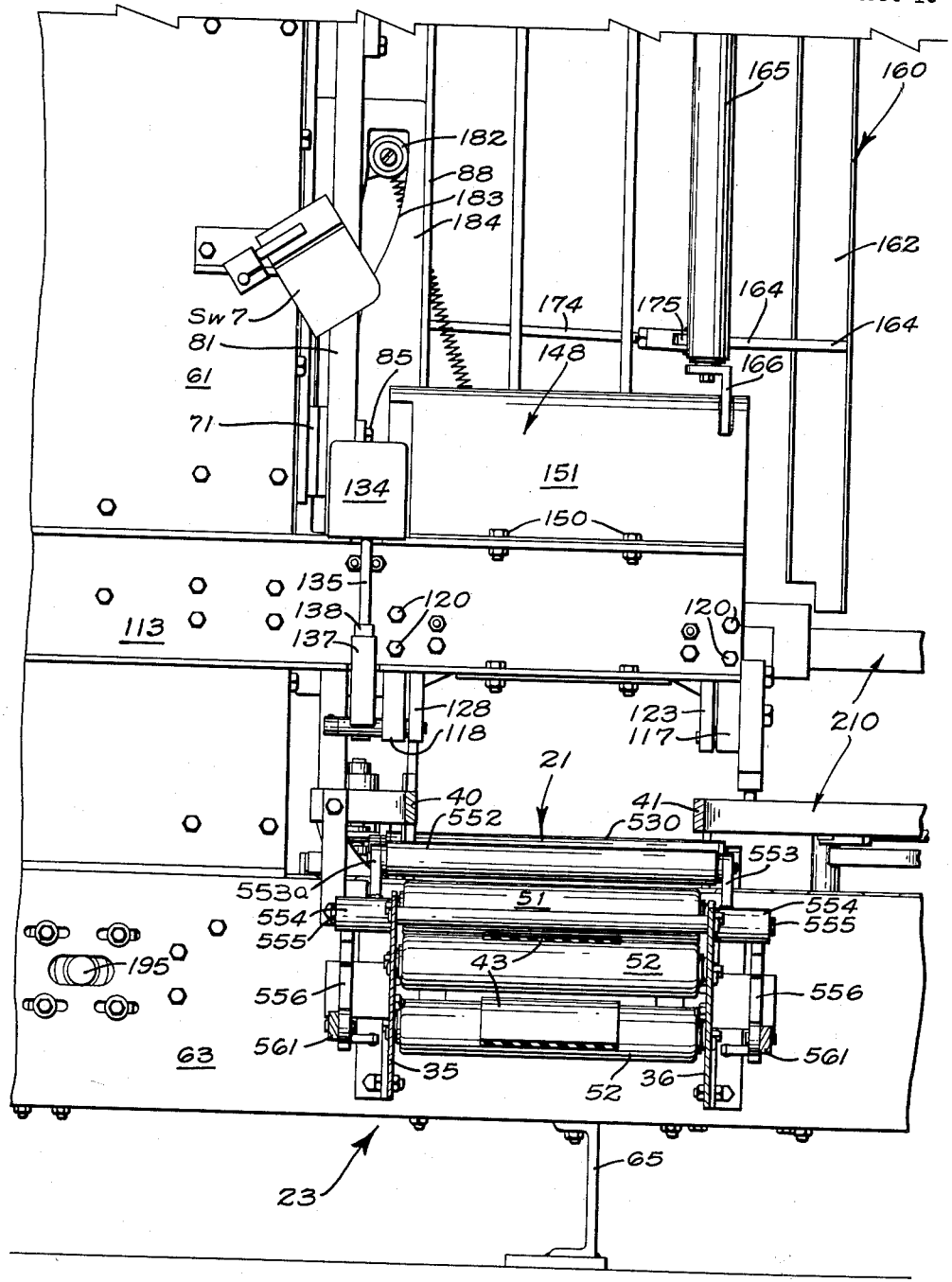
FIG_11

July 9, 1963
E. A. VERRINDER ET AL
3,096,891
APPARATUS FOR HANDLING CASES
Original Filed July 11, 1955
23 Sheets-Sheet 11
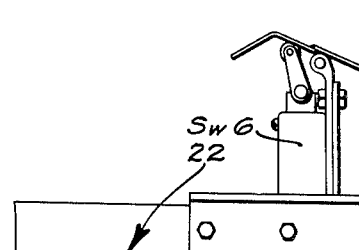
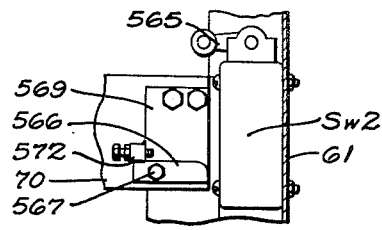
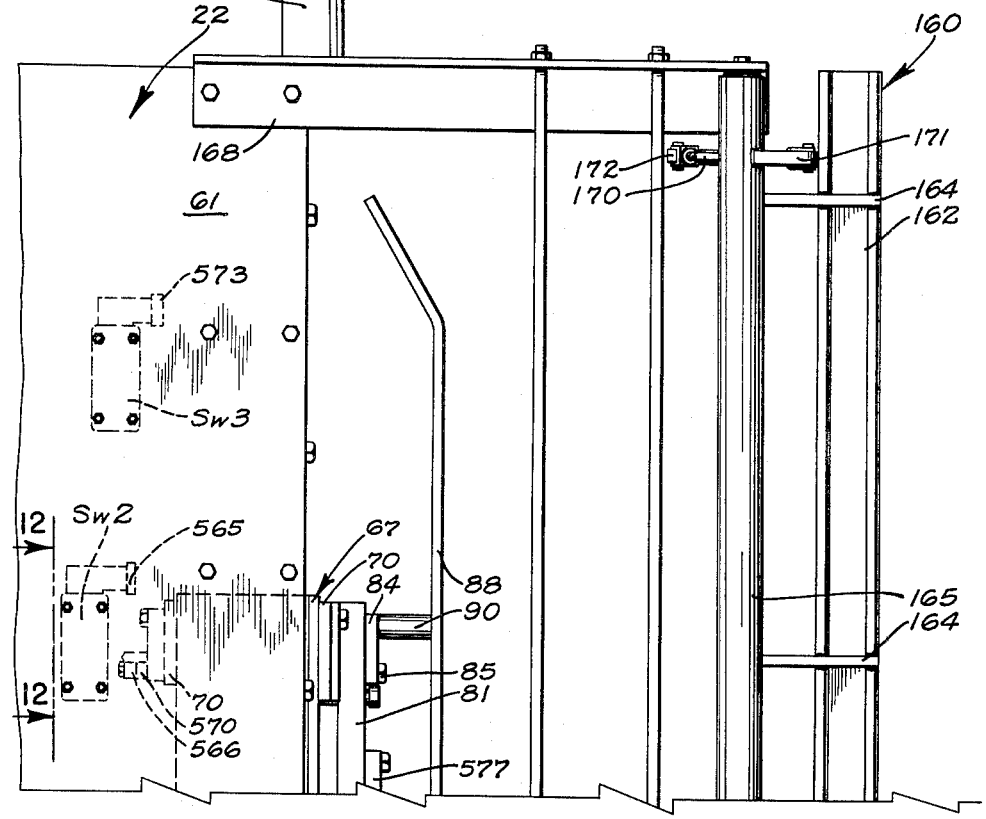
INVENTORS
ERNEST A. VERRINDER
EARLE J. McGRATH
BY Hans G. Hoffmeister
ATTORNEY

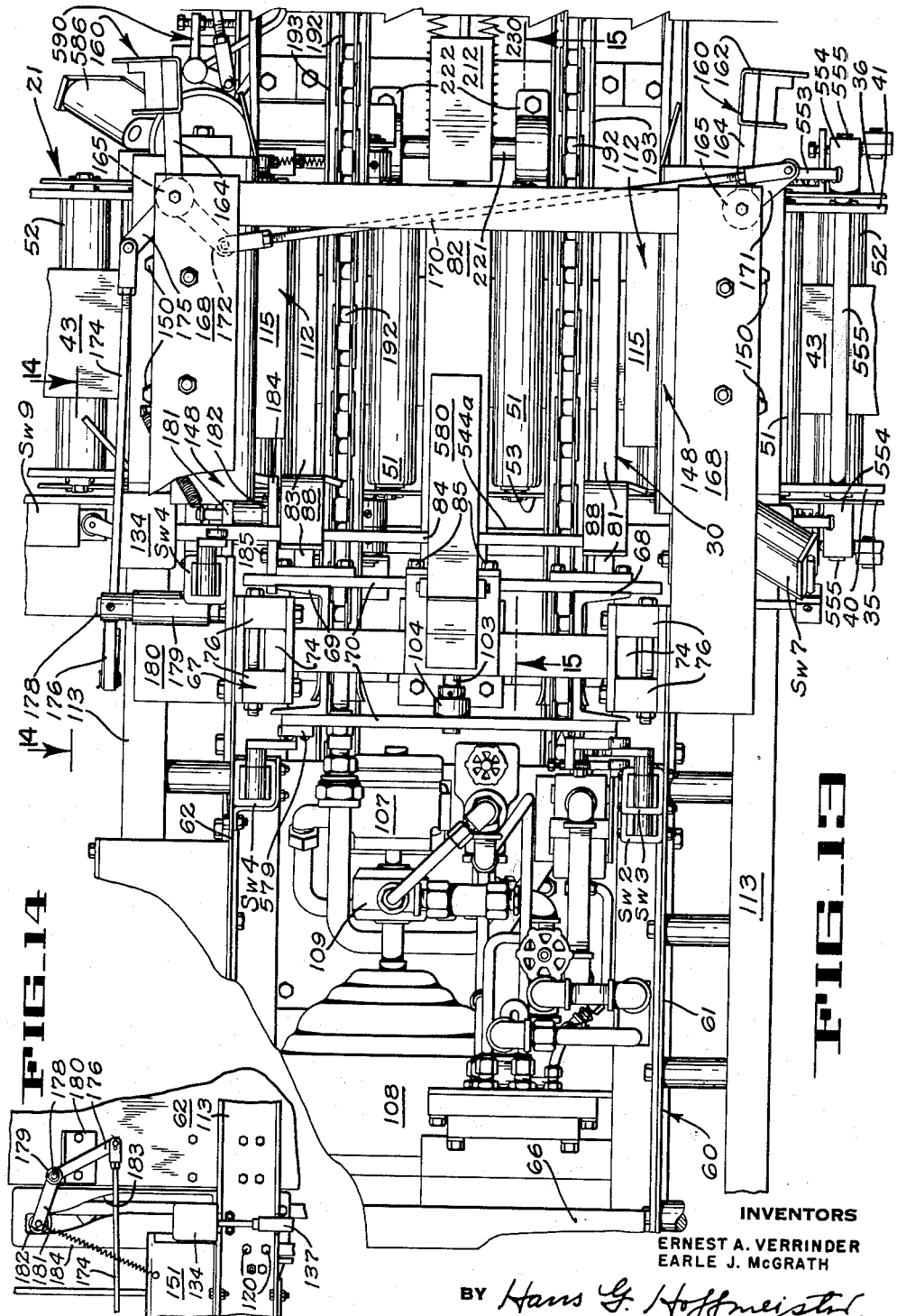

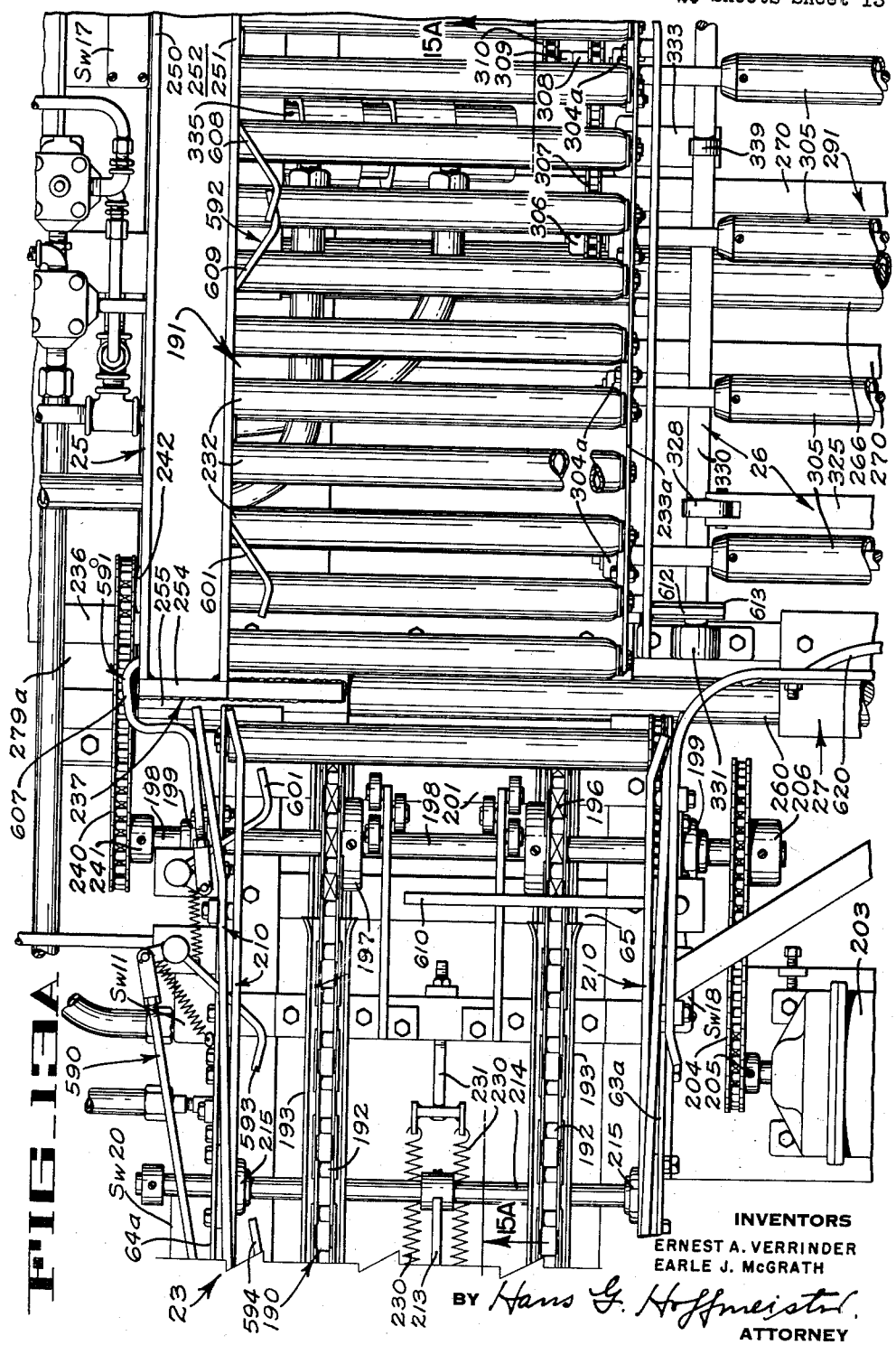

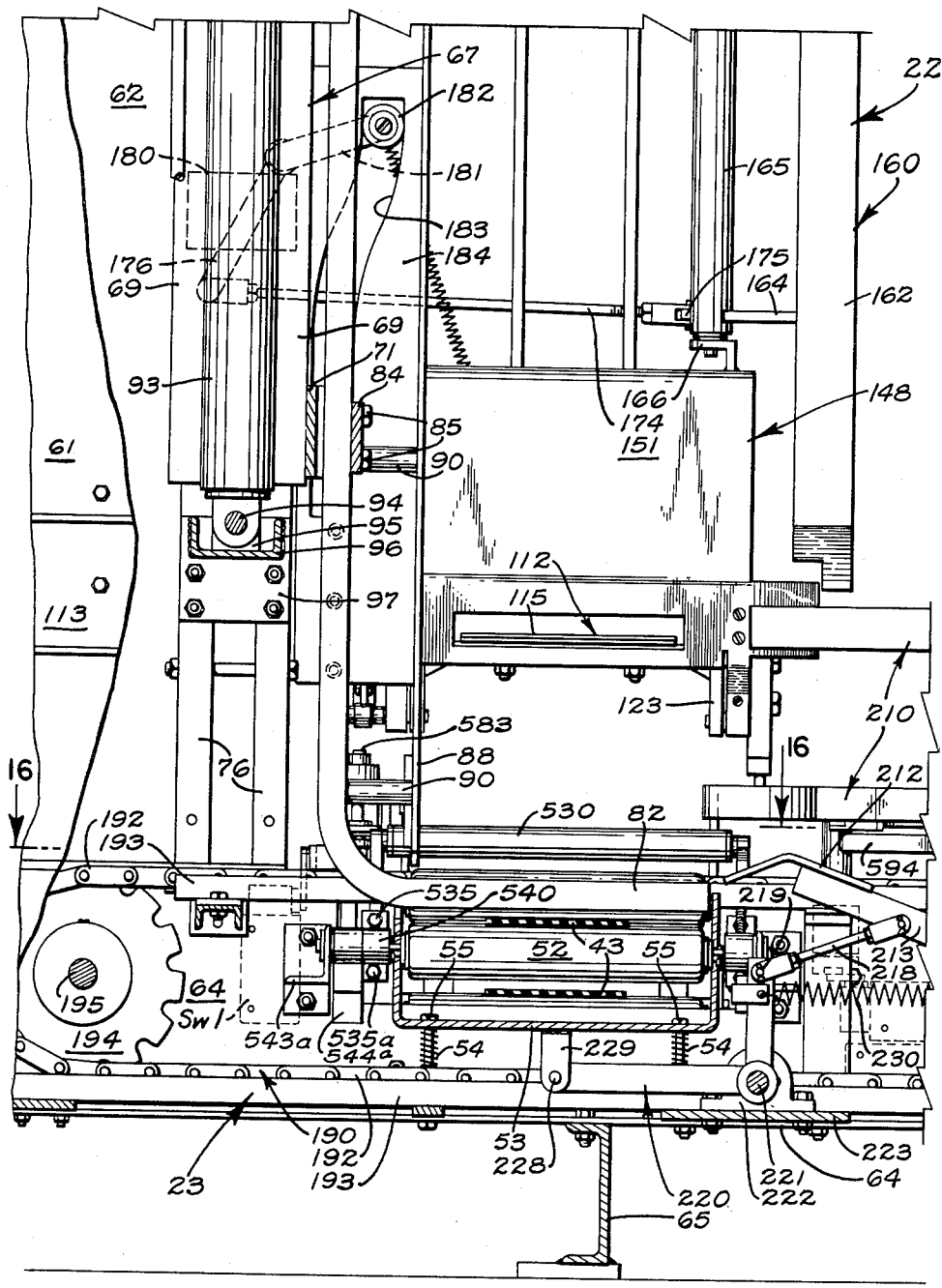

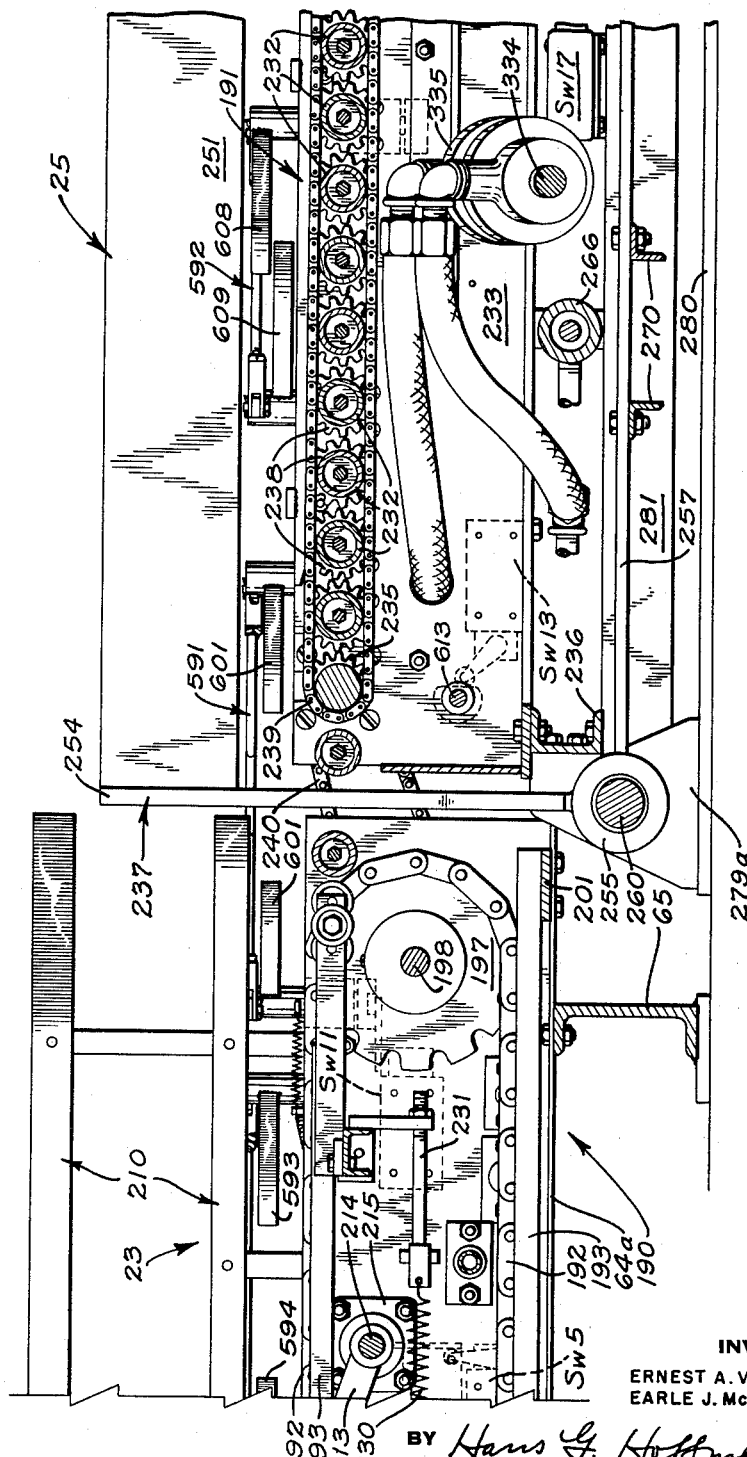

July 9, 1963
E. A. VERRINDER ET AL
3,096,891
APPARATUS FOR HANDLING CASES
Original Filed July 11, 1955
23 Sheets-Sheet 16
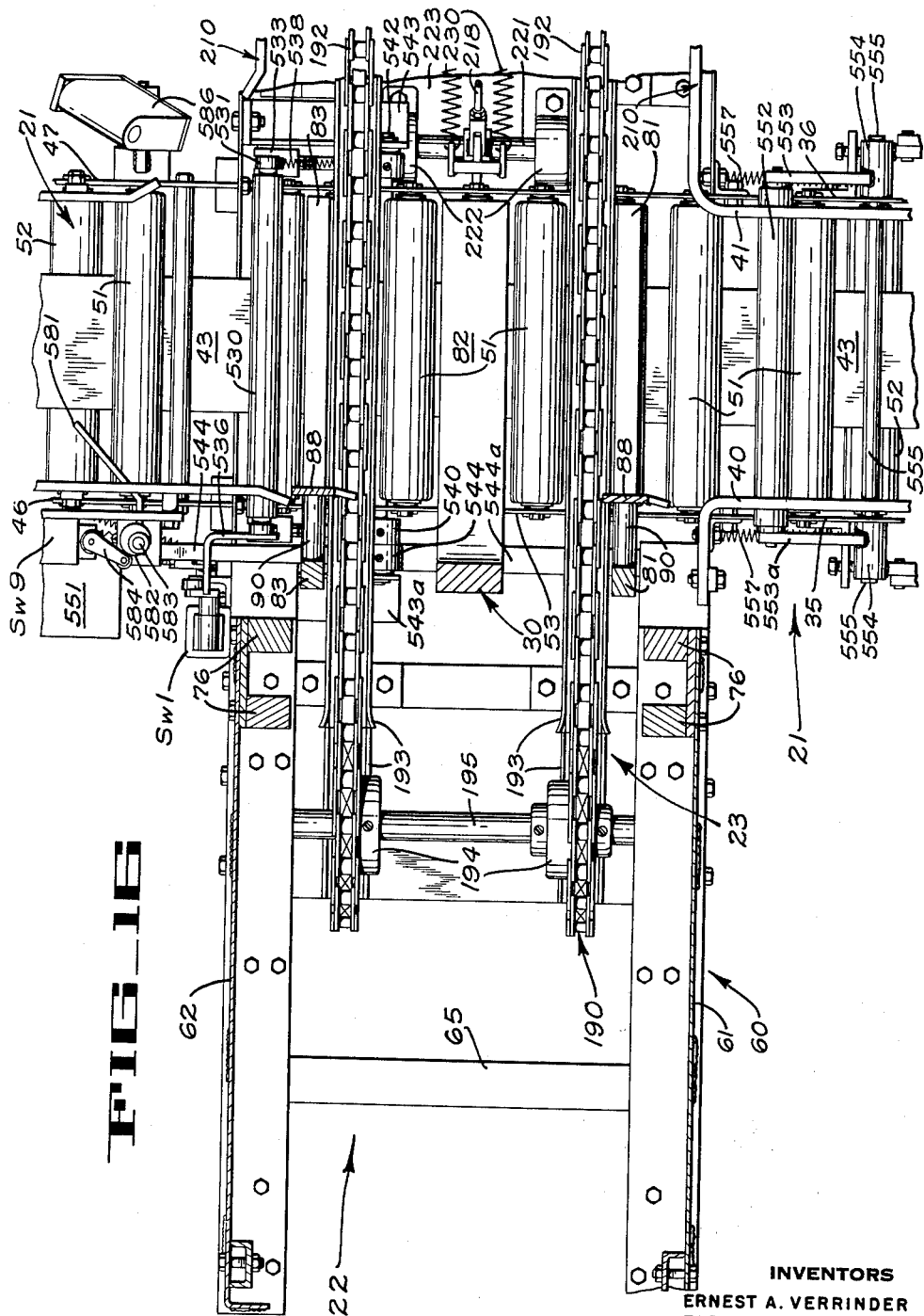
FIG_16
INVENTORS
ERNEST A. VERRINDER
EARLE J. McGRATH
BY Hans G. Hoffmeister.
ATTORNEY

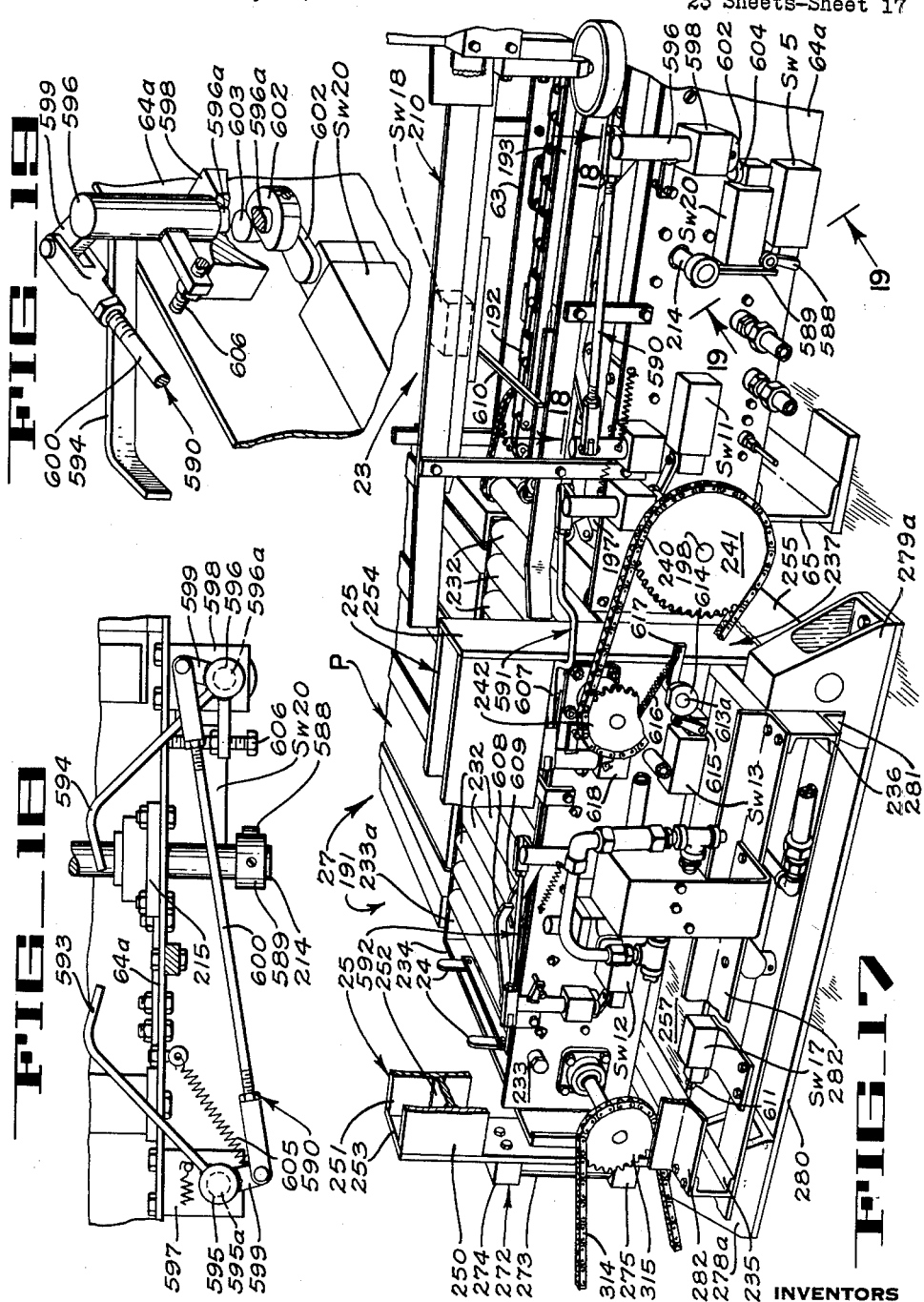

July 9, 1963

E. A. VERRINDER ET AL 3,096,891

APPARATUS FOR HANDLING CASES

Original Filed July 11, 1955

FIG_20

INVENTORS
ERNEST A. VERRINDER
EARLE J. McGRATH

BY Hans G. Hoffmeister.
ATTORNEY

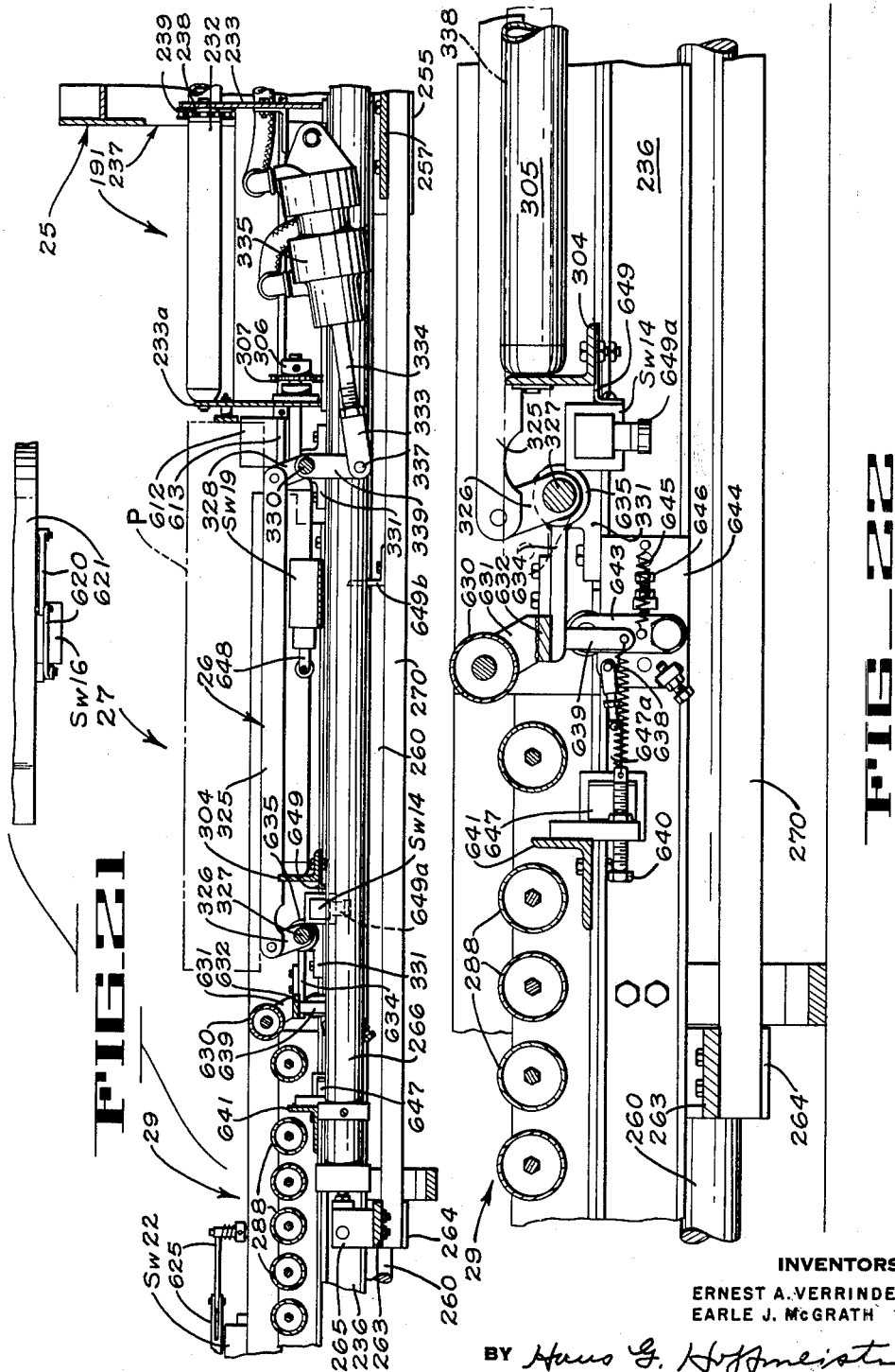

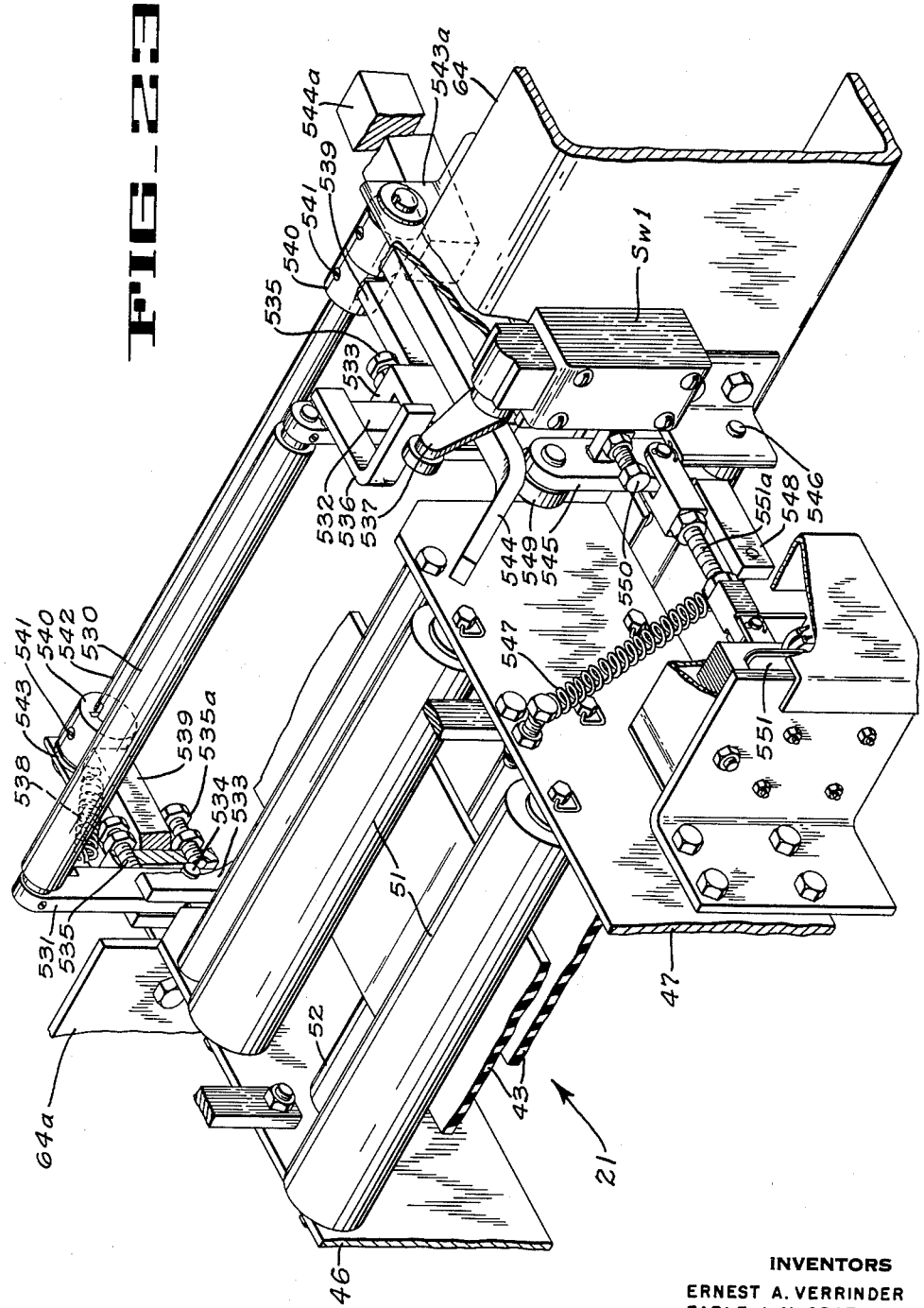

July 9, 1963
E. A. VERRINDER ET AL
3,096,891
APPARATUS FOR HANDLING CASES
Original Filed July 11, 1955
23 Sheets-Sheet 21
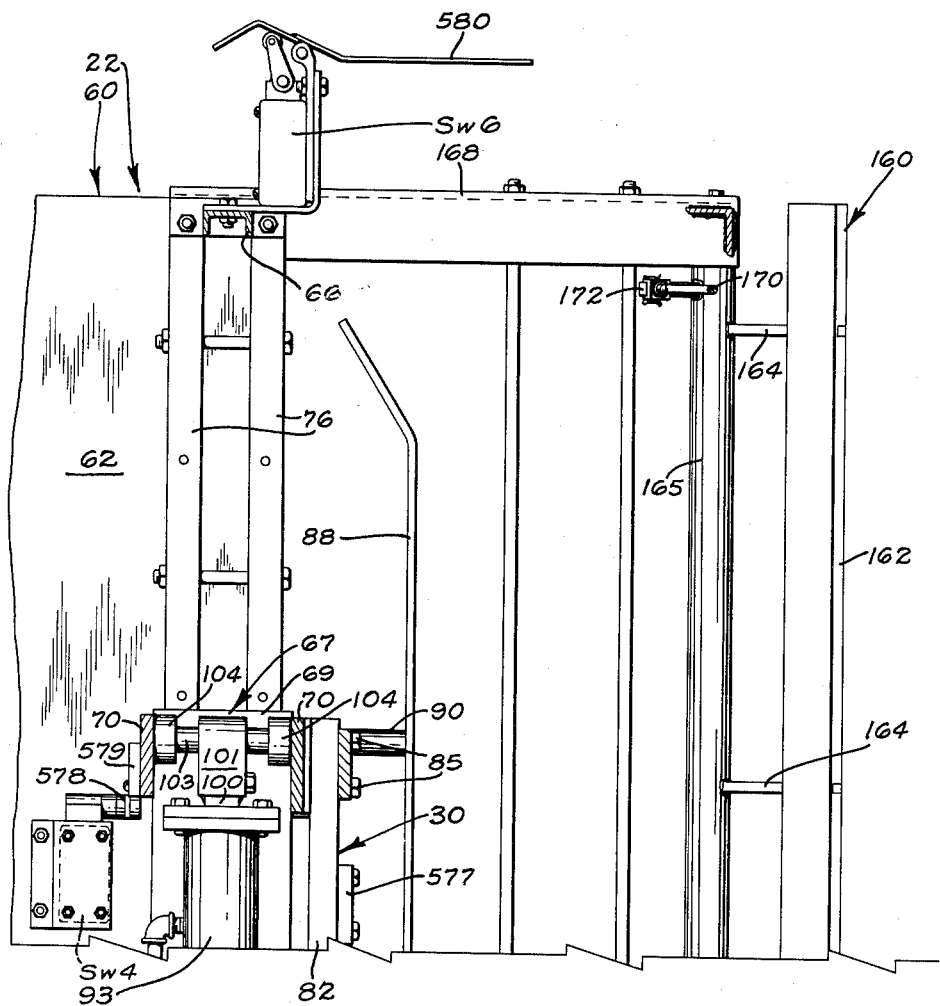
INVENTORS
ERNEST A. VERRINDER
EARLE J. McGRATH
BY Haus G. Hoffmeister.
ATTORNEY

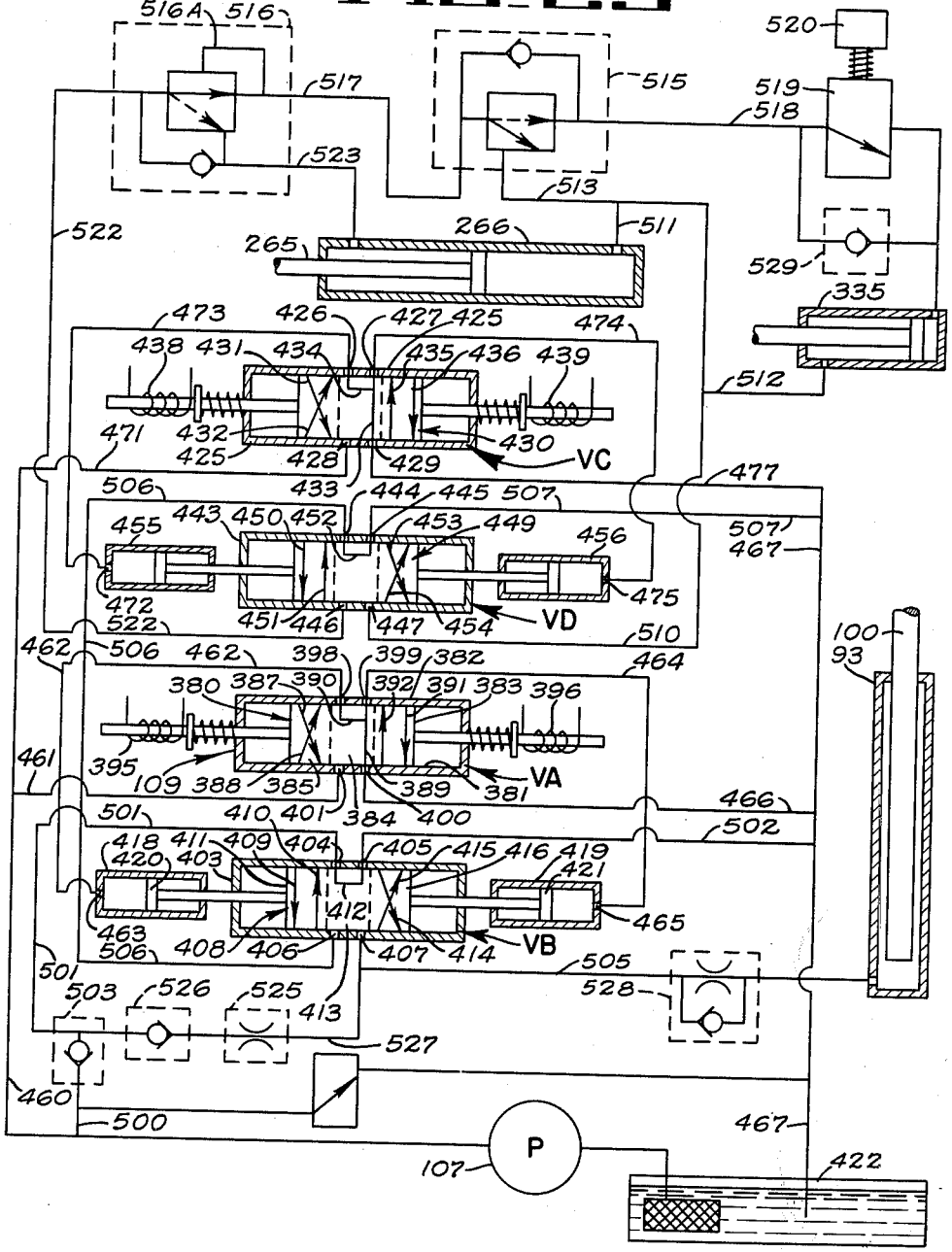

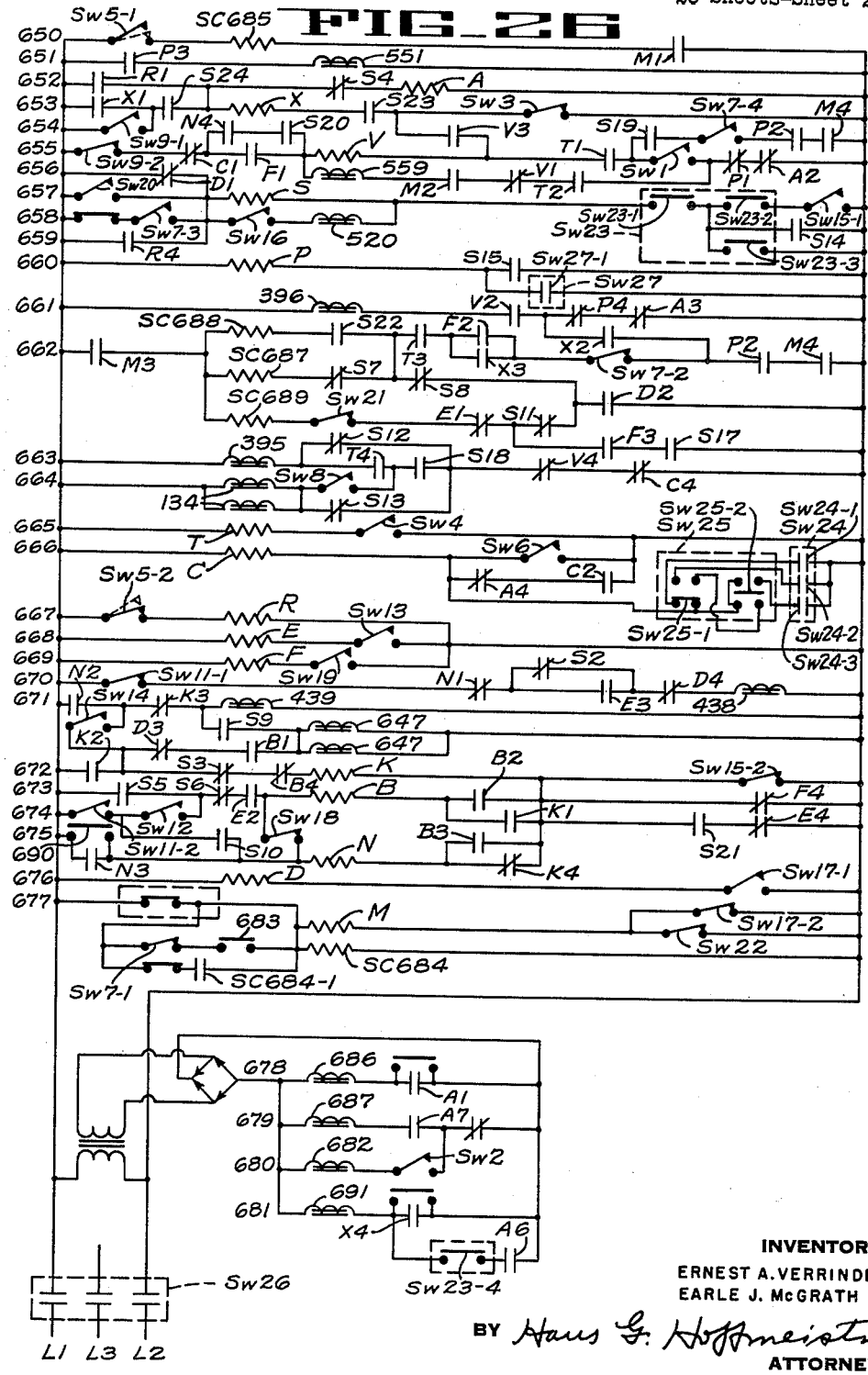

United States Patent Office 3,096,891
Patented July 9, 1963

3,096,891
APPARATUS FOR HANDLING CASES
Ernest A. Verrinder, Riverside, and Earle J. McGrath, Chula Vista, Calif., assignors to FMC Corporation, San Jose, Calif., a corporation of Delaware
Original application July 11, 1955, Ser. No. 521,011, now Patent No. 2,993,315, dated July 25, 1961. Divided and this application Dec. 9, 1960, Ser. No. 74,896
4 Claims. (Cl. 214—6)

This application is a division of our copending application, Serial No. 521,011 filed July 11, 1955, now Patent No. 2,993,315.

This invention pertains to apparatus for handling boxes, cases and the like and more particularly relates to an improved apparatus for loading cases on and removing cases from a support surface, such as a pallet.

In present day processing plants pallets are used extensively for handling both semi-finished and finished products. When the product is disposed in cases, the cases can be stacked one on top of the other and several stacks can be arranged side-by-side on the pallet. With such an arrangement, the cases can be economically and efficiently moved from place to place in the plant by means of a fork lift truck that has tines which are adapted to be inserted in or under the pallet to lift the pallet and the load of cases thereon.

In bottling plants, bottles are continuously being washed, filled and put in cases, and cases of full bottles are continuously being stacked on pallets for removal from the plant. Since cases of full bottles are quite heavy, it is difficult in a modern plant for men to continuously stack full cases on pallets fast enough to keep up with the filling and casing operations.

It is an object of the present invention to provide an efficient machine for handling stacks of cases.

Another object is to provide an apparatus capable of either stacking cases or removing cases from a stack.

Another object is to provide improved conveying means for a pallet loading machine.

Another object is to provide a case stacking apparatus in which the elements are automatically controlled to carry out their individual functions in a timed and co-ordinated sequence.

Other and further objects and advantages of the present invention will become apparent from the following description taken in connection with the accompanying drawings.

FIG. 1 is a plan of the case handling machine of the present invention.

FIG. 2 is a fragmentary perspective of the machine of FIG. 1.

FIG. 3 is a fragmentary schematic perspective of the machine of FIG. 1, taken in the direction of arrows 3—3 of FIG. 1.

FIG. 4 is a flow diagram, showing the pallet loading cycle of the machine of FIG. 1.

FIG. 5 is a flow diagram showing the pallet unloading cycle.

FIGS. 6 and 6A are lower and upper portions, respectively, of a composite vertical section through the machine of FIG. 1, taken on line 6—6 of FIG. 1.

FIG. 7 is a fragmentary perspective of the case stacking unit used in the machine of FIG. 1, the unit being shown detached from the rest of the machine.

FIG. 8 is an enlarged fragmentary plan view, particularly showing the case stacking unit of the present invention.

FIG. 9 is a fragmentary perspective of one of two solenoid-controlled case-supporting blades used in the stacking unit of FIG. 6.

FIG. 10 is a vertical section taken on line 10—10 of FIG. 9.

FIGS. 11 and 11A are the lower and upper portions, respectively, of a composite, fragmentary vertical section taken along line 11—11 of FIG. 8, particularly showing the stacking unit in elevation.

FIG. 12 is a vertical section taken on line 12—12 of FIG. 11A.

FIGS. 13 and 13A are left and right portions, respectively, of an enlarged, fragmentary, composite plan of the stacker unit and a portion of the stack conveyor used in the machine of FIG. 1.

FIG. 14 is a reduced fragmentary side elevation looking in the direction of arrows 14—14 of FIG. 13.

FIGS. 15 and 15A are left and right portions, respectively, of a composite vertical section taken along the line 15—15 of FIG. 13 and line 15A—15A of FIG. 13A.

FIG. 16 is a horizontal section taken on line 16—16 of FIG. 15.

FIG. 17 is a fragmentary perspective of a portion of the stack conveyor of the present machine taken in the direction of arrows 17—17 of FIG. 1.

FIG. 18 is an enlarged plan view of a portion of FIG. 17, particularly showing one set of switch-actuating feeler arms, taken along lines 18—18 of FIG. 17.

FIG. 19 is a perspective of a portion of the feeler arm mechanism of FIG. 18, with parts broken away, taken in the direction of arrows 19—19 of FIG. 18.

FIG. 20 is a fragmentary plan view of a portion of the machine of FIG. 1, particularly showing portions of the stack conveyor, the pallet feed conveyor and the pallet discharge conveyor.

FIG. 21 is a vertical section taken on line 21—21 of FIG. 20.

FIG. 22 is a vertical section taken on line 22—22 of FIG. 20.

FIG. 23 is a fragmentary perspective taken on line 23—23 of FIG. 8, particularly showing a portion of the control mechanism.

FIG. 24 is a vertical section taken on line 24—24 of FIG. 8.

FIG. 25 is a schematic diagram of the hydraulic control mechanism and the hydraulic circuit used in the machine of FIG. 1.

FIG. 26 is a schematic wiring diagram of the electrical control system used in the case-handling machine of FIG. 1.

In FIGS. 1 and 2 a system for handling cases is illustrated which may be used either as a pallet loading system, a pallet unloading system, or as a combination loading-unloading system. No re-arrangement of parts is necessary when it is desired to shift the machine from one cycle to the other. However, some of the elements that are used during the pallet loading cycle are not used during the pallet unloading cycle and vice versa. Also, some of the elements operate in a different manner during one cycle than they do during the other cycle. Accordingly, in order to fully explain the entire apparatus and its function, it will be necessary to described each cycle separately.

*Pallet loading cycle.*—When used as a pallet loader, the machine of FIG. 1 comprises a feed conveyor 20 arranged to carry cases one at a time to an accelerator conveyor 21 which, in turn, delivers the cases in single file to a centered position in a case stacking unit 22. The stacking unit is adapted to receive each case and raise it upwardly in the unit, adding it to cases thereabove to form a stack having a desired number of cases. When a stack is formed, it is lowered onto a stack conveyor 23 (FIGS. 1 and 3), which projects at right angles away from the accelerator conveyor and is arranged to carry the stack away from the stacking unit to a position against a pair of pivotally mounted stationary stops 24 located at the end of the stack conveyor. The first stack of cases is detained at the stops 24 until a predetermined number of additional stacks is formed in the stacker unit 22 and carried by the stack conveyor 23 to a position adjacent to and in alignment with the first stack, thereby forming a line of stacks. When a line of stacks is formed, a hydraulically operated ram 25 shifts the line, as a unit, in a direction transverse to the stack conveyor 23 and onto an empty pallet P, which has previously been positioned on a parallelogram lift mechanism 26 at a pallet loading station 27 by a pallet conveyor 28. The pusher 25 is arranged to push the first line of stacks of cases onto the pallet and then return to its original position on the side of the stack conveyor 23 remote from the empty pallet. When the second line of stacks has been formed on the stack conveyor 23, the ram 25 shifts the new line as a unit transversely of the stack conveyor, onto the pallet, and into contact with the first line which is then pushed across the pallet in front of the new line. When the pallet is loaded with a predetermined number of lines of stacks, the operating stroke of the ram is lengthened and it engages the loaded pallet and shifts it bodily onto a gravity discharge roller conveyor 29.

*Pallet unloading cycle.*—When the machine of FIG. 1 is used as a pallet unloader, the cases move in a direction substantially opposite to the direction in which they move when the machine is used as a pallet loader. Accordingly, as seen in the flow diagram (FIG. 5) of the unloading cycle, a pallet PP, loaded with lines of stacks of cases, is deposited on the pallet conveyor 28 which carries the pallet to the unloading station 27 and positions it on the parallelogram lift mechanism 26 (FIG. 1). During the unloading cycle the ram 25 (FIG. 5) is normally positioned on the side of the pallet nearest the gravity discharge conveyor 29. This position will hereinafter be referred to as the unload position of the ram. The ram 25 shifts the line of stacks, one at a time, onto the stack conveyor 23 where each stack is separated from the line and moved into the unstacker unit 22. It will be noted that the stack conveyor 23 has a conveying surface adapted to move the cases in an opposite direction, during the unloading cycle, from the direction it moves the cases during the loading cycle. A fork 30 lifts the entire stack up into the unit 22 and then lowers the cases one at a time onto the accelerator conveyor 21 which delivers the cases in single file to a gravity discharge roller conveyor 31.

The feed conveyor 20 (FIGS. 1 and 3) comprises an endless chain section 32 which has a drive shaft 33 journalled in spaced side plates 35 and 36 of a conveyor support structure and driven by a motor 37 through a drive chain 38 that engages a sprocket 39 on the drive shaft 33. A pair of stationary side rails 40 and 41 (FIG. 2) guide each case as it moves along the feed conveyor 20 and onto the accelerator conveyor 21 which comprises a belt 43 (FIGS. 6 and 8) in frictional engagement with a drive roller 44, which is rotatably journalled in the side plates 35 and 36, and an idler roller 45, which is journalled on the opposite side of the stacker unit 22 in spaced side plates 46 and 47. The drive roller 44 is driven by the motor 37 through the chain 38 which engages a sprocket 49 keyed to an end portion of the roller.

As best seen in FIG. 6, the upper surface of the belt 43 of the accelerator conveyor 21 is in frictional driving contact with a plurality of rollers 51 that form a conveyor surface. Guide rollers 52 maintain the belt in taut condition and in engagement with the conveyor rollers 51. Three of the conveyor rollers 51 are journalled in a U-shaped cradle 53 (FIGS. 6 and 15) which is resiliently mounted on a plurality of springs 54. Each of the springs 54 is disposed around the upper portion of a fixed stud bolt 55, between a nut 56 and the lower surface of the cradle. The resiliently mounted cradle 53 (FIG. 6) extends across the front end of the stacker unit 22, and the rollers 51 of the cradle provide a support surface from which each individual case is lifted upwardly into the stacker unit and onto which each stack of cases is deposited after it is formed in the stacker unit.

The stacker unit 22 comprises a rigid housing 60 (FIGS. 7 and 8) which includes a pair of spaced upright side plates 61 and 62, which are secured to and extend upwardly from heavy base channels 63 and 64, respectively. Transverse channels 65 are positioned under the channels 63 and 64 to hold the housing a predetermined distance above the surface on which the unit 22 is supported. The side plates 61 and 62 are secured together by a plurality of cross braces 66 (FIG. 8) to form a rigid structure which is open at the front and rear sides. A carriage 67 (FIG. 7) is mounted for vertical reciprocation adjacent the open front side of the housing. The carriage 67 comprises a rigid frame made up of two spaced, vertical channels 68 and 69 connected by upper connector plates 70 and lower connector plates 71. The carriage is guided in its vertical movement by means of guide bearings 74 which are secured to the web of each channel and project outwardly to a position between two rigid spaced gib bars 76 which define a guideway for the bearings. Each of the channels 68 and 69 has two such guide bearings 74, one near its upper end and one near its lower end. The fork assembly 30 is mounted on the carriage 67 for vertical reciprocation therewith. The fork assembly comprises three spaced lifter arms 81, 82, and 83 secured together by upper and lower cross bars 84. The bolts 85 which secure the lifter arms 81, 82, and 83 to the cross bars 84 also secure the entire fork assembly to the connector plates 70 and 71 of the carriage. A vertical bumper or guide bar 88 (FIG. 7) is secured by bolts 89 to each of the side lifter arms 81 and 83. These bars, which extend to the top of the carriage 67, and are held in spaced relation to the lifter arms by means of spacer tubes 90, serve to align the rear faces of cases in the stacker unit.

The fork carriage 67 is raised by means of a hydraulic power cylinder 93 which has a lower end pivotally mounted on a bar 94 that extends between ears 95 projecting upwardly from the web of a transverse channel 96. The channel 96 has a mounting plate 97 welded to each end and each plate 97 is bolted to the vertical gib bars 76. The power cylinder 93 (FIG. 7) has a piston rod 100 journalled for sliding movement through the upper end of the cylinder. A connector eye 101, which is secured to the piston rod exteriorly of the cylinder 93, is pivotally disposed on a rod 103 which is anchored at each end in a boss 104 formed on each upper connector plate 70. When fluid is directed into the power cylinder 93, the piston rod 100 is forced outwardly of the cylinder to elevate the fork carriage 67. When the fluid is drained from the cylinder and returned to a reservoir, the fork carriage is permitted to descend by gravity.

Referring to FIG. 8, it will be seen that a pump 107 is mounted inside the unit 22 for supplying fluid to the power cylinder 93. The pump is driven by a motor 108 and is connected in a hydraulic circuit which is controlled by solenoid operated valves 109. The operation and control of the hydraulic circuit will be described in detail hereinafter.

When a case to be stacked is positioned on the fork 30 and the fork carriage is elevated, the case is carried upwardly between two spaced case-supporting blade assemblies 112 (FIGS. 6 and 9), each assembly being mounted on a channel 113 that is secured to one side of the housing 60 and projects outwardly from the forward end of the housing over the accelerator conveyor 21. The two support assemblies 112 are identical but are oppositely disposed so that support blades 115 (FIG. 6) of both assemblies project inwardly into the path of upward movement of the case being raised on the fork 30. A description of one support assembly will serve to disclose the structure of both assemblies. Each assembly 112 (FIG. 9) comprises a pair of horizontally spaced, vertical blocks 117 and 118 which are secured by cap-screws 120 to the web of the channel 113. Near its lower end, the block 117 carries a pin 122 on which a bracket arm 123 is pivotally mounted. The block 118 journals an actuating shaft 124 which is aligned with the pin 122 and projects a short distance to each side of the block 118. A lever 125 is keyed to the shaft 124 on one side of the bearing block, while a second bracket arm 128 is secured to the shaft on the other side of the block. The bracket arms 123 and 128 are connected by a flat bar 130 which is secured, as by welding, to the outer end faces of the bars. One of the flat case-supporting blades 115 is secured on the upper surface of the bar 130 of each bracket by capscrews 133. When the actuating shaft 124 is rotated in a counterclockwise direction (FIG. 10) the blade 115 is swung from the full-line position, out of the path of movement of a case being elevated, to the dotted line position in which it extends part way into the path of the case.

The actuating shaft 124 is swung in a counterclockwise direction by a solenoid 134 (FIG. 9). A rod 135, which is secured at one end to the movable core of the solenoid 134, is slidably journalled in a collar 136 secured to one face of a plate 137. A coil spring 140 is disposed be-between a locknut 141 on the threaded end of the rod 135 and the collar 136, while a collar 138 is secured to the shaft above the fixed collar 136 to limit the downward movement of the rod 135. The plate 137 is connected to the lever 125 through a link 143 and a triangular shafted lever 144 that has a hub 145 pivotally mounted on a pin 146 projecting outwardly from the block 118. When the solenoid 134 is energized, the rod 135 (FIG. 10) is pulled upwardly, compressing the spring 140 and raising the plate 137. The triangular lever 144 is pivoted in a counter-clockwise direction about the pin 146, causing the actuating shaft 124 to be swung in a counterclockwise direction to carry the case-supporting blade 115 into the path of movement of the cases.

As best seen in FIGS. 6 and 7, each case-supporting assembly 112 is partially enclosed by a sheet metal guide plate 148 which is secured on its inner side by cap-screws 149 to the bearing block 117 and is secured on its outer side to the top surface of the channel 113 by cap-screws 150. Each guide plate 148 has a slanted, upper, inner surface 151 adapted to guide to a centered position cases that are being lowered in the stacker unit.

As best seen in FIG. 2, a pair of vertically disposed, elongated gates 160 are positioned across the front of the stacker unit. Each gate 160 comprises a flat, elongated, vertical plate 162 (FIGS. 11–11A) secured by rigid straps 164 to a rotatable rod 165. When the rods 165 are rotated through a part of a revolution, the gates 160 are swung from a closed position against the front face of a stack of cases in the stacker to the open position of FIGS. 11–11A, substantially parallel to the centerline of the stack conveyor, to permit the stack conveyor to remove the stack of cases from the stacker unit during the case stacking operation or, in the unstacking operation, to permit the stack conveyor to bring a stack of cases into the unit 22. The gates 160 are maintained in their closed position during all vertical movement of cases in the stacker in order to prevent the cases from shifting out of alignment during such movement.

Each rotatable rod 165 (FIGS. 11 and 11A) is journalled at its lower end in an angle support member 116 (FIG. 11) which is welded to the outer surface of one of the guide plates 148. At its upper end, the rod is journalled in an angle bar 168 (FIG. 11A) that is secured to and projects forwardly from the housing 60. The two rotatable rods 165 are interconnected for joint rotary movement over a limited range by means of a bar 170 (FIG. 13) that is pivotally connected at one end to a radial arm 171 integrally formed on one rod 165 and, at the other end, to a radial arm 172 integrally formed on the other rod 165. The interconnection is so arranged that clockwise rotation of one rod causes counterclockwise rotation of the other rod. Joint movement of the rods is effected by an adjustable push rod 174 (FIG. 13) that is pivotally connected at one end to a radial arm 175 welded to one of the rods 165 and is pivotally connected at the other end to a lever 176 that is keyed to a shaft 178 journalled in a bearing 179 of a support bracket 180 (FIG. 14) which is secured to the side plate 62 of the housing of the stacker unit. A cam follower lever 181, which is also keyed to the shaft 178, carries a roller follower 182. The follower 182 rides in a camming groove 183 in a plate 184 that is secured by cap-screws 185 to the lifter arm 83 of the fork 30. Accordingly, when the fork is elevated, the cam roller follower will be actuated by the upwardly moving cam plate 184 to rotate the shaft 178 clockwise (FIG. 14), swinging the lever 176 clockwise and moving the push rod 174 toward the left. This movement of the push rod 174 causes clockwise rotation of the rod 165 (FIG. 13) to which the push rod 174 is connected, and counterclockwise rotation of the other rod 165, whereby the gates 160 are swung to closed position. Similarly when the fork is lowered, the gates 160 are moved to open position.

The stack conveyor 23 (FIG. 1) comprises an endless chain section 190 and a live roll section 191. The endless chain section 190 comprises a pair of chains 192 (FIG. 16) disposed in guide channels 193 and trained around spaced idler sprockets 194 which are keyed to a shaft 195 rotatably journalled in bearing assemblies secured to the side plates 61 and 62 of the housing 60. The chains 192 are also trained around drive sprockets 196 and 197 (FIG. 13A) that are keyed to a shaft 198 rotatably journalled in bearing assemblies 199 on the spaced side walls 63a and 64a which are extensions of the channels 63 and 64 (FIG. 7) which support the housing 60 of the stacker unit. The walls 63a and 64a are held in spaced relation by cross braces 201 (FIG. 13A). The shaft 198 is driven by a motor 203 through a chain 204 that is trained around a sprocket 205 on the motor shaft and a sprocket 206 on the shaft 198.

In FIG. 15 it will be noted that the upper surface of the chains 192 is slightly below the level of the top surface of the rollers 51 of the center section of the accelerator conveyor. Also, in FIG. 16 it will be seen that the chains 192 are substantially parallel to the rollers 51 and are disposed between adjacent rollers. With this arrangement, when the fork 30 lowers a stack of cases, the stack is deposited on the rollers 51 first. However, since the rollers at the center section of the accelerator conveyor are journalled in the spring-supported cradle 53, the rollers move downwardly and deposit the stack of cases on the chains 192 of the stack conveyor. The springs, which support the yieldable center section of the accelerator conveyor, are designed so that they will not compress under the weight of a single case of full bottles when it is advanced into the stacker unit by the accelerator, but will compress under the weight of a stack of cases of full bottles. Rails 210 (FIGS. 15 and 15A) are provided on each side of the endless chain section 190 to guide the cases as they are advanced on the stack conveyor.

A paddle 212 (FIG. 15) is disposed centrally of the chains 192 in the path of movement of a stack of cases being moved along by the stack conveyor. The paddle has a support bar 213 keyed to a transverse shaft 214 (FIG. 15A) that is journalled for rotation in bearings 215 (FIG. 13A) mounted on the opposite walls 63a and 64a on the stack conveyor frame. The support bar 213 is pivotally connected at an intermediate portion to a rod 218 (FIG. 15) that is connected by a pivot pin 219 to a bellcrank 220. The bellcrank is pivotably supported by a rod 221 which is journalled in bearings 222 (FIGS. 6 and 15) disposed on a frame member 223 extending transversely of the stack conveyor. The bellcrank 220 is pivotally connected at 228 (FIG. 15) to an ear 229 depending from the underside of the spring-supported cradle 53. When the paddle 212 is depressed by a stack of cases passing over the paddle, the bellcrank is rotated counterclockwise about rod 221 causing the cradle 53 to be drawn downwardly. Therefore, when a stack of cases is carried into the unit 22 during the unloading operation, the paddle 212 and the cradle 53 will be moved downwardly, causing the rollers 51 of the accelerator conveyor to be positioned below the top surface of the endless chains and permitting the stack on the endless chains to enter the unit 22. Also, when the paddle 212 is depressed, its transverse pivot shaft 214 (FIG. 15A) will be rotated counterclockwise to perform a control operation which will be fully explained hereinafter. Two springs 230 (FIGS. 15 and 13A), which are connected at one end to the bellcrank 220 and at the other end to a stationary, adjustable bar 231 (FIG. 15A), urge the bellcrank in a clockwise direction to move the paddle 212 and the cradle 53 to their upper positions.

The live roll section 191 of the stack conveyor comprises a plurality of spaced, parallel rollers 232 (FIG. 17) journalled for rotation in spaced upstanding side walls 233 and 233a. The walls 233 and 233a are connected at one end by a rigid plate 234 and are secured in upright position on the top surfaces of two spaced channels 235 and 236 which are part of the support structure 237 of the ram 25. The support structure 237 will be described in detail presently. Each roller 232 has a sprocket 238 (FIG. 15A) keyed to one end for engagement by a chain 239. The rollers 232 are all rotated simultaneously by the chain 239 which, in turn, is driven by the motor 203 through a chain 240 (FIG. 13A) that is trained around a sprocket 241 on the drive shaft 198 of the endless chain conveyor section and around a sprocket 242 keyed to one of the parallel rollers 232. Thus, the motor 203, which drives the endless chain section 190 of the stack conveyor also drives the live roll section 191 and, accordingly, both sections are in operation at the same time. The stop bars 24 (FIG. 17) are pivotally mounted on the rigid end plate 234 of the frame of the live roll section to stop the movement of the stacks of cases as they are moved along the stack conveyor in a direction away from the stacker unit.

As previously mentioned, a ram or pusher 25 (FIG. 2) is mounted for reciprocating movement over the live roll section 191 of the stack conveyor and over the pallet P positioned at station 27. The ram 25 (FIG. 17) is a boxlike member made up of upstanding flat plates 250 and 251 rigidly connected by a horizontal spacer plate 252 and end plates 253 and 254. The end plates project downwardly and terminate at their lower ends in bearing sleeves 255 (FIGS. 15A and 20). The sleeves 255 are connected together by a rigid strap 257 which is directly below the ram 25. Each sleeve 255 is slidably journalled on a rod 260 that extends longitudinally along the sides of the gravity discharge conveyor 29, the station 27 and below the live roll section 191 of the stack conveyor. A crosshead 263 (FIG. 20) extends transversely of the rods 260 and has bearing sleeves 264 slidably supported on the rods 260. Near the center of the crosshead 263 the movable end 265 of a piston of a hydraulic power cylinder 266 is connected so that when pressurized fluid is delivered to the cylinder 266, the crosshead 263 will be moved toward the left (FIG. 20) along the stationary rods 260. The crosshead is connected to the ram 25 by means of two angle-type tie-bars 270 which are secured, at one end, to the crosshead and, at the other end to the rigid strap 257 (FIG. 15A) that connects the sleeves 255 of the ram. The hydraulic power cylinder 266 is double-acting and, accordingly, the direction of longitudinal movement of the ram 25 will depend upon which end of the cylinder the fluid is directed into.

A latch 272 (FIG. 20) is secured to the side face of a rod 273 that is pivotally mounted between flanges 274 and 275 (FIG. 17) that project outwardly from the flat end plate 253 of the ram 25. A spring 276 (FIG. 20), which is connected between the rod 273 and a forward extension 277 of the plate 253, urges the latch 272 inwardly. The latch is positioned at the level of a pallet positioned at unloading station 27. As the ram 25 moves to the right (FIG. 20) to push cases off the pallet, the latch rides along the side of the pallet. After the pallet is unloaded and the ram moves past the right end of the pallet, the latch is spring-urged inwardly so that, when the ram returns toward the left, the latch will engage the pallet and move it onto the discharge conveyor 29.

The previously mentioned frame support structure 237 (FIG. 20) is an elongated, generally rectangular member which supports the live roller section 191 of the stack conveyor, a portion of the pallet conveyor 28, and the discharge conveyor 29 and includes the four corner bearing blocks 278, 278a, 279, and 279a. The blocks 278 and 278a are connected by the longitudinally extending channel 235, and the blocks 279 and 279a are connected by the channel 236. At the stack conveyor end of the frame (FIG. 17), the blocks 278a and 279a are connected by a transverse plate 280, and the channels 235 and 236 are connected by angle bars 281 and 282. At the discharge conveyor end of the frame, the bearing blocks 278 and 279 are connected by transverse plates 283 and 284 (FIG. 20). A pair of longitudinal side rails in the form of angle bars 285 and 286 are secured to the top surface of the channels 235 and 236, respectively, at the discharge end of the frame. Holes in the upstanding flanges of the angle bars journal a plurality of spaced parallel rollers 288 for free rotation. The rollers are positioned to form a conveying surface which slopes downwardly toward the discharge end so that pallets deposited on the rollers will be automatically discharged.

The pallet conveyor 28 (FIG. 1) comprises an endless chain section 290 and a roller section 291. The endless chain section 290 comprises two chain sections 292 and 293. The chains 294 of section 292 are driven from a motor 295 through a drive shaft 296 and drive sprockets 297. The chains 298 of section 293 are driven half as fast as the chains 294, through drive sprockets 300 and a drive shaft 301 that is driven through a chain and sprocket drive 302 from a shaft 303 of chain section 292.

The roller section 291 of the pallet conveyor 28 comprises a plurality of parallel rollers 305 rotatably journalled in a transverse stationary support bar 304 (FIG. 20) and in bearings 304a in the wall 233a of the frame of the stack conveyor. One of the rollers 305 has a sprocket 306 keyed thereon to receive a drive chain 307. A second one of the rollers 305 has two sprockets 308 and 309 keyed thereon, the sprocket 308 being adapted to be engaged by the chain 307 and the sprocket 309 being arranged to receive a chain 310 that is also engaged around a sprocket 311 on a driven shaft 312. The shaft 312 is driven by a chain 314 that engages a second sprocket 315 on the shaft 312 and a sprocket 316 on the drive shaft 296 of the endless chain section of the pallet conveyor 28. Thus, the roller section of the pallet conveyor has two rollers that are positively driven by the endless chain section of the pallet conveyor and two rollers that are freely rotatable. In addition a short, freely rotatable roller 318 is rotatably mounted at the entrance to the roller section 300 of the pallet conveyor 28.

The parallelogram pallet lift mechanism 26 comprises a pair of spaced bars 325 (FIGS. 20 and 21) each of which is pivotally connected to an arm 326 extending radially from a shaft 327 and to an arm 328 extending radially from a shaft 330. The shafts 327 and 330 extend transversely of the frame and are journalled in bearing 331 secured to the channels 235 and 236. The shaft 330 is rotated by means of a yoke 333 (FIG. 21) that is connected to the piston rod 334 of a double-acting hydraulic power cylinder 335. A pin 337 extends through the yoke 333 and through a hole in a lever 339 that is keyed to the shaft 330. When fluid is directed to one end of the power cylinder 335 to draw the piston rod 334 into the cylinder, the shaft 330 is rotated in a counterclockwise direction and the pallet support bars 325 are moved to their lowered position, indicated by dot-dash lines 333 in FIG. 22, below the conveying surface provided by the rollers 305. When pressurized fluid is directed to the opposite end of the power cylinder, the piston rod 334 (FIG. 21) is forced outwardly of the cylinder to rotate the shaft 330 in a clockwise direction and raise the pallet support bars 325. As the bars 325 move upwardly they contact a pallet on the rollers 305, lift it off the rollers and swing it in an arced path to a position closely adjacent the live roll section 191 of the stack conveyor. In its elevated position the top surface of the pallet is substantially at the level of the conveying surface provided by the rollers of section 191 of the stack conveyor. As a result, lines of stacks of cases can be easily shifted between the conveying surface and the pallet on the bars 325 of the lift mechanism.

A ramp 344 (FIG. 1) is positioned adjacent the pallet conveyor 28 so that a fork lift truck can be run up the ramp to facilitate the depositing of a loaded pallet on the pallet conveyor. The ramp is pivotally mounted on pins 345 at the end of the ramp remote from the pallet conveyor. A pair of springs 346 are connected between the upper edge of a channel 347 in the support frame of the pallet conveyor 28 and the ramp for normally lifting the end of the ramp to a slightly elevated position.

*Hydraulic controls.*—In the hydraulic circuit of FIG. 25, the symbols VA, VB, VC, and VD represent four control valves. Valves VC and VD are in the hydraulic circuit controlling the flow of fluid under pressure to the ram cylinder 266 and to the cylinder 335 of the parallelogram lift mechanism 26, while the valves VA and VB are in the hydraulic circuit controlling the flow of fluid to the fork carriage cylinder 93. The valve VA has a valve core 380 slidable to the right and to the left in the bore 381 of a valve housing 382. In order to more clearly disclose the valve and its function, the valve core is illustrated as consisting of three sections 383, 384, and 385 separated by dotted lines. Section 385 has cross-passages indicated by lines 387 and 388, section 384 has a through passage 389 and an angled passage 390, and section 383 has parallel through passages 391 and 392. The valve core 380 is shifted back and forth in the bore 381 by means of solenoids 395 and 396, the solenoid 395 having a plunger connected to one end of the valve core 380 and the solenoid 396 having a plunger connected to the other end of the valve core.

The valve housing 382 has four ports 398, 399, 400 and 401. The valve core 380 normally assumes a spring-centered position with the passage of the central section 384 establishing communication between certain of the ports in the valve housing. When the solenoid 395 is energized, the valve core is pulled toward the left to align the parallel passages 391 and 392 of section 383 with certain of the ports in the housing. Similarly, when the solenoid 396 is energized, the valve core is pulled toward the right to align the cross-passages 387 and 388 with the ports of the valve housing.

Valve VB is similar in construction to valve VA and comprises a valve housing 403 with four ports 404, 405, 406, and 407. A valve core 408 is disposed for sliding movement in the bore of the housing 403 to align either the parallel passages 409 and 410 of a core section 411, the U-shaped passage 412 of a section 413, or the cross-passages 414 and 415 of a section 416 with certain of the ports of the valve housing. Movement of the valve core 408 in the housing is controlled by hydraulic cylinders 418 and 419, each of which has a piston 420 and 421, respectively, attached by a piston rod to an end of the valve core. When fluid is directed into the cylinder 418, on the side of the piston 420 remote from the valve core, the piston is moved toward the right to align the parallel passages 409 and 410 with the ports of the housing. When fluid is directed into the cylinder 419, on the side of the piston 421 remote from the valve core, the piston is moved toward the left to align the cross passages 414 and 415 with the ports in the valve housing. In the normal spring-centered position, the U-shaped passage 412 is in communication with ports 404 and 405.

As will be explained presently, the position of the valve core 380 of valve VA determines whether fluid will be delivered to the cylinder 418 or to the cylinder 419. Also, the position of the valve core 408 of the valve VB determines whether fluid in the hydraulic circuit will be directed to the cylinder 93 that controls the fork lift carriage 67, to the ram control valve VD, or to a reservoir 422. Thus, the solenoid controlled valve VA sets as a pilot valve for the control valve VB.

The valve VC is identical to valve VA, having a housing 425 with ports 426, 427, 428, and 429, and a core 430 with cross passages 431 and 432, a through passage 433 and a short passage 434, and parallel passages 435 and 436. Solenoids 438 and 439 control the movement of the core 430. The valve VD is identical to valve VB, having a housing 443 with ports 444, 445, 446, and 447, and a core 449 with parallel through passages 450 and 451, a U-shaped passage 452, and cross-passages 453 and 454. Hydraulic cylinders 455 and 456 control the movement of the valve core 449.

In the hydraulic circuit, the pump 107 directs fluid through a pilot line 460—461 to port 401 of valve VA. The port 398 is connected by a line 462 to a port 463 in the cylinder 418, the port 399 is connected by a line 464 to a port 465 in the cylinder 419, and the port 400 is connected by a line 466—467 to the reservoir 422. The pump 107 also directs fluid to the pilot valve VC by means of a line 460—471 which communicates with port 428. The port 426 is connected to a port 472 in cylinder 455 by a line 473, the port 427 is connected by a line 474 to a port 475 in the cylinder 456, and the port 429 is connected by a line 477—467 to the reservoir 422.

The pump 107 delivers fluid to the valve VB through a line 500—501 which communicates with the port 404 in the valve housing. A spring-loaded check valve 503, connected in the line 500—501, is arranged to provide fluid at 60 p.s.i. at all times for pilot pressure. The port 405 of valve VB communicates through line 502—467 with reservoir 422, the port 407 communicates through line 505 with power cylinder 93, and the port 406 communicates through a line 506 with port 444 of valve VD. The port 445 of valve VD communicates through a line 507—467 with the reservoir 422. The port 447 communicates through a line 510—511 with one end of the ram cylinder 266 and through line 510—512 with one end of the power cylinder 335 which controls the parallelogram lift mechanism 26, and through line 510—513 with a sequence valve 515. The valve 515 is in communication with a second sequence valve 516 through a line 517, and the valve 515 communicates through a line 518 with a shut-off valve 519 that is controlled by a solenoid 520. The port 446 of valve VD communicates through line 522 with the sequence valve 516 which, in turn, communicates through a line 523 with one end of the ram power cylinder 266. A partially open needle valve 525 and a check valve 526 are disposed in a drain line 527 connecting the supply line 500 leading from pump 107 with line 505. Also, a deceleration valve 528, which has an integral check valve, is arranged in the line 505 to the fork cylinder 93.

When the solenoid 438 is energized, the valve core 430 is pulled toward the left to align passage 435 with ports 426 and 428 and to align passage 436 with ports 427 and 429. In this position of the valve core, pilot fluid in line 460 is directed through passage 435 and line 473 to the hydraulic cylinder 455 while the cylinder 456 is drained to the reservoir 422 through line 474, passage 436 and line 477—467. The piston in hydraulic cylinder 455 is moved toward the right, shifting the valve core 449 to align the passage 450 with ports 444 and 446 and the passage 451 with ports 445 and 447. With this alignment of the passages, fluid in line 506 will be directed by means of passage 450, line 522, valve 516, line 517, valve 515, line 518, and valve 519 to one end of the power cylinder 335 to raise the lift mechanism 26. When the lift mechanism 26 is fully raised, pressure builds up in internal pilot line 516A of the valve 516 and causes the valve to port fluid through line 523 to one end of the ram power cylinder 266 causing the ram 25 to move in the direction in which it moves to push stacks of cases from the pallet. Also, with this alignment of the passages 450 and 451, the line 511—510 leading to the other end of the ram power cylinder 266 is drained to the reservoir 422 through the passage 451 and line 507—467. Thus, it is to be noted that when solenoid 438 is energized, the ram 25 moves in a pallet unloading direction if there is fluid under pressure in line 506. Accordingly, hereinafter the solenoid 438 will be called the pallet unloading solenoid.

When solenoid 439 is energized, the core 430 is pulled toward the right, aligning passage 431 with ports 426 and 429 and aligning passage 432 with ports 428 and 427. With this setting, pilot fluid in supply line 471 passes through passage 432 and line 474 to the cylinder 456 while the cylinder 455 is drained to the reservoir 422 through line 473, passage 431 and line 477—467. When pilot fluid enters cylinder 456, the core 449 of valve VD is shifted toward the left, aligning passage 453 with ports 444 and 447, and aligning passage 454 with ports 446 and 445. With this valve core setting, fluid under pressure in supply line 506 is directed through passage 453 and line 510—511 to one end of the ram power cylinder 266 causing the ram 25 to move in the direction in which it moves when loading stacks of cases on the pallet. When the ram reaches the end of the stroke, pressure builds up in the line 513 and causes the valve 515 to permit fluid to pass therethrough, whereby the power cylinder 335 is drained through check-valve 529, valve 515, valve 516 and valve VD to reservoir 422. Also, with this valve setting, the other end of the power cylinder 266 is drained to the reservoir 422 through line 523, valve 516, line 522, passage 454, and line 507—467. Thus, it will be noted that when solenoid 439 is energized, the ram 25 is moved in its pallet loading direction if there is fluid under pressure in supply line 506. Accordingly, hereinafter, the solenoid 439 will be called the pallet loading solenoid.

The presence of fluid under pressure in supply line 506 depends upon the setting of the control valve VB which is controlled by the solenoid-operated pilot valve VA. When the valve VA is in a centered position, as shown in FIG. 25, the fluid in line 501 is directed to the reservoir 422. A second setting of the valve VA causes fluid to be directed to the fork power cylinder 93 to lift the fork 30 while the supply line 506 is drained. A third setting of the valve VA causes the fork power cylinder 93 to be drained while fluid under pressure is directed through supply line 506.

When the solenoid 395 is energized, the valve core 380 of valve VA is shifted toward the left bringing the passage 392 into alignment with the ports 398 and 401 and bringing the passage 391 into alignment with the ports 399 and 400. With this setting of the valve core, pilot fluid in the supply line 460—461 is directed through passage 392 and line 462 to the hydraulic cylinder 418, while the hydraulic cylinder 419 is drained to reservoir 422 through line 464, the passage 391 and line 466—467. Accordingly, the piston 420 of cylinder 418 is shifted toward the right to move the valve core 408 of valve VB toward the right to align the through passage 409 with ports 404 and 406 and to align the passage 410 with the ports 405 and 407. With this setting, fluid from pump 107 in supply line 500—501 is directed through passage 409 and line 506 to port 444 of valve VD where it is either directed by U-shaped passage 452, and line 507—467 to the reservoir 422 or is directed to either end of the ram power cylinder 266 depending upon whether solenoid 438 or 439 is energized. Also, with this first setting of the valve core 408, the fork power cylinder 93 is drained to the reservoir 422 through line 505, passage 410 and line 502—467, permitting the fork 30 to move downwardly during the formation of a stack to lift an additional case into position under the new stack. It will, therefore, be noted that when the solenoid 395 is energized, the fork 30 is moved downwardly. Accordingly, hereinafter the solenoid 395 will be referred to as the fork lowering solenoid.

When the solenoid 396 is energized, the valve core 380 of valve VA is pulled toward the right to align the cross-passage 388 with ports 401 and 399 and to align the passage 387 with the ports 398 and 400. With this setting of the valve core, pilot fluid in line 461 will be directed through the passage 388 and line 464 to the hydraulic cylinder 419, while the cylinder 418 is drained to the reservoir 422 through line 462, passage 387 and lines 466—467. Thus, the piston 421 of cylinder 419 is moved toward the left to shift valve core 408 of valve VB toward the left bringing cross-passage 414 into alignment with ports 404 and 407 and bringing cross-passage 415 into alignment with ports 406 and 405. With this setting of the valve core 408, fluid under pressure in the supply line 500—501 is directed through passage 414 and line 505 to the fork lift cylinder 93 to cause the fork 30 to be elevated. Also, with this setting of the valve core 408, fluid in line 506 will be drained to the reservoir 422 through passage 415 and line 502—467. It will, therefore, be noted that when solenoid 396 is energized, the fork 30 will be elevated. Accordingly, hereinafter the solenoid 396 will be referred to as the fork elevating solenoid.

*Electrical controls.*—Since the present pallet loading and unloading machine is fully automatic, several electric switches are positioned throughout the machine to initiate and coordinate the various operations. These control switches are actuated by the pallet, the cases on the pallet, or by various movable members of the machine. During the pallet loading cycle, full cases are delivered one by one into the stacker unit 22 by the accelerator conveyor 21. When the case reaches a centered position in the unit 22, it contacts a transverse bar 530 (FIGS. 3 and 23) that is disposed across the path of movement of the case. The bar 530 (FIG. 23) is pivotally mounted on the upper ends of two upstanding arms 531 and 532, each of which is pivotally mounted between the arms of a yoke 533 on a pin 534 (only one pin being shown). The arms 531 and 532 can pivot through a limited range defined by the position of adjustable capscrews 535 and 535a in the yoke. The range of pivotal movement is such that when a case contacts the bar 530, the bar is pivoted forwardly, causing an abutment member 536, carried by the arms 532, to contact an actuator 537 of a switch Sw1. As soon as the case is removed from against the stop bar 530, a spring 538, connected between the arm 531 and one of two spaced yoke-supporting arms 539, returns the bar 530 to normal upright position, with the arms 531 and 532 abutting the stopscrew 535.

Each yoke 533 is mounted on the outer end of one of the arms 539. Each arm 539 has a hub 540 secured by a setscrew 541 to a shaft 542. The shaft 542 is rotatably journalled in rigid support members 543 and 543a. A control arm 544 is secured to the shaft 542 and projects radially outwardly therefrom. A counterweight 544a is secured to the bottom of the arm 544 on the opposite side of the shaft. The weight of the stop bar 530, and the control arm 544 tends to rotate the shaft 542 to move the stop bar 530 downwardly out of case-arresting position. However, the bar is held in its upper position by a lever 545 that is pivotally mounted on a pin 546 which is suitably secured on the frame channel member 64. A spring 547, connected between the side plate 47 and an arm 548 secured to the lever 545, urges the lever 545 in a clockwise direction (FIG. 23) to an upright position wherein a roller 549 on the end of the lever 545 is disposed under the control arm 544, and a stop screw 550 on the lever abuts a suitable stop plate (not shown). The lever 545 is arranged to be withdrawn from position under the control arm 544 by means of a solenoid 551 that has a plunger pivotally connected through a link 551a to the lever 545. With the above arrangement, the stop bar 530 is normally held in upright case-arresting position by the lever 545. When a case contacts the bar, the bar can pivot a limited distance sufficient to actuate switch Sw1, and when the solenoid 551 withdraws the lever 545 the stop bar will automatically swing downwardly.

When the Sw1 is actuated, an electric circuit is controlled whereby a stop bar 552 (FIGS. 3 and 6), which is mounted transversely of the accelerator conveyor adjacent the entrance of the stacker unit, is raised to a position in the path of trailing cases on the accelerator conveyor. The stop bar 552 (FIGS. 6 and 16) is rotatably mounted on two arms 553 and 553a which extend radially from tubular hubs 554 that are rotatably mounted on a shaft 555 journalled in the side plates 35 and 36 of the accelerator conveyor 21. Each hub 554 (FIG. 6) has a depending arm 556 which anchors one end of a tension spring 557 that is also connected to the base channel 63. The spring tends to pivot the arms 556 in a counterclockwise direction. A solenoid 559 is mounted on the side plate 36. The plunger 560 of the solenoid is pivotally connected to a lever 561 which is mounted on a pivot pin 562 of a fixed bracket 563. The lever 561 carries a roller 564 that bears against the adjacent arm 556 and prevents the weight of the stop bar 552 from pivoting the bar downwardly out of case-arresting position. When the solenoid 559 is energized, the plunger 560 is drawn into the solenoid housing and the lever 561 is pivoted upwardly, releasing the adjacent arm 556 and permitting the stop bar 552 to drop out of case-arresting position. When the solenoid 559 is de-energized, the plunger 560 is moved out of the housing by a spring (not shown) causing the lever 561 to swing the arm 556 in a counterclockwise direction to raise the stop bar 552 to case-arresting position.

In the stacker unit there are four electric control switches Sw2, Sw3, Sw4 and Sw8 (FIG. 3). Switch Sw2 (FIGS. 11A and 12), which actuates a case counting device, is mounted on the inner face of the housing side plate 61 and has an actuator 565 that projects into the path of movement of a pivotal latch 566. The latch is pivotally mounted by means of a pin 567 on a bracket 569 that is secured to one of the upper connector plates 70 of the fork carriage 67. A tubular spacer 570 holds the latch 566 a fixed distance from the bracket 569. When the fork carriage is elevated the latch 566 engages and trips the switch actuator 565. An arm 572, projecting outwardly from the bracket 569, prevents pivotal movement of the latch and, accordingly, the latch acts as a rigid member to operate the switch Sw2. When the fork carriage is lowered, the latch pivots about pin 567 when it contacts switch Sw2 and, as a result, the case counter switch Sw2 is not actuated on the descending stroke of the fork carriage.

The switch Sw3 is mounted on the inner face of the side plate 61 slightly above switch Sw2. Switch Sw3 has an actuator 573 disposed in the path of movement of the bracket 569 and is actuated thereby when the fork carriage is elevated. Since actuation of switch Sw3 stops the elevation of the fork carriage, the bracket 569 will never go past the switch actuator 573.

The switch Sw8 (FIG. 6A) is mounted by means of a mounting plate 575 on the side plate 62 of the stacker housing. Switch Sw8 has an actuator 576 arranged to be contacted by a cam 577 that is mounted on the lifter arm 83. Accordingly the switch Sw8 is actuated during both the elevating and the lowering movement of the fork carriage 67.

The switch Sw4 (FIGS. 6A and 24) is mounted on the inner face of the side plate 62 and has an actuator 578 arranged to be contacted by a cam 579 mounted on one of the upper connector plates 70 of the fork carriage 67. The switch Sw4 and the cam 579 are so positioned that the switch is actuated when the fork carriage reaches its lowest position.

A safety switch Sw6 (FIG. 24) is mounted at the top of the stacker housing and has an elongated actuator 580 that is disposed directly above the stack of cases being formed in the stacker. If for any reason the formation of the stack is not stopped when the desired number of cases is in the stack, the switch Sw6 will be actuated when the cases are stacked high enough to actuate this switch. Under ordinary operating conditions switch Sw6 will not be actuated.

A switch Sw9 (FIG. 16) is mounted alongside the portion of the accelerator conveyor 21 that carries empty cases out of the unit 22 during the unstacking operation. The switch Sw9 has a pivotally actuator 581 that projects over the surface of the accelerator conveyor in position to be contacted by an empty case that is being carried out of the unstacker unit. The actuator 581 is connected to a cam 582 that is eccentrically mounted on a pivot pin 583. When the actuator 581 is contacted and pivoted by the empty case leaving the unstacker, the cam 582 is rotated, forcing a switch lever 584 in a clockwise direction to trip the switch Sw9.

A photo relay Sw7 (FIG. 8) is mounted on the inlet side of the stacker facing downwardly and inwardly over the central portion of the accelerator conveyor. This switch receives a beam of light projected diagonally upwardly from a projector 586. The beam extends across the path of movement of cases being raised and lowered in the stacker unit. As long as there is a case in the stacker unit, the beam is broken. When the unit is empty, the beam is re-established and projected into the photo relay switch Sw7 to control a circuit in which the switch is connected.

Referring to FIG. 8, it will be noted that when a stack of cases moves onto or off the center portion of the accelerator conveyor the paddle 212 is moved downwardly causing the shaft 214 to be rotated. A double throw switch Sw5 (FIG. 17) is mounted on the outer face of the channel extension 64a and has an actuator 588 arranged to be held in a predetermined position by an arm 589 that is keyed to the shaft 214. When the paddle 212 is in its spring-urged upper position, the actuator 588 is held in the position shown in FIG. 17 wherein one set of contacts is open and the other set is closed. When the paddle is depressed by a stack of cases passing over the paddle, the shaft 214 is swung a fixed distance in a clockwise direction (FIG. 17), permitting the actuator 588 to move to a second position reversing the positions of the two sets of contacts.

Stacks of cases being advanced on the stack conveyor 23 (FIG. 13A) pass by and actuate three consecutive switch actuating linkages 590, 591, and 592. These three linkages are almost identical in construction and operation and it is believed that a detailed description of linkage 590 will adequately disclose all three. Linkage 590 (FIGS. 17 and 18) comprises a pair of oppositely facing feeler arms 593 and 594 which have integrally formed pivot shafts 595 and 596, respectively (FIG. 19). The shafts 595 and 596 have reduced diameter portions 595a and 596a rotatably journalled in bearing blocks 597 and 598, respectively. The bearing blocks 597 and 598 are secured in spaced relation on the outer face of the base channel extension 64a. Each feeler arm extends radially from one side of its pivot shaft while a short arm 599 extends from an opposite side of the shaft. The two short arms 599 are interconnected by a rod 600 that is pivotally connected to both arms. The reduced shaft portion 596a has a cam disc 602 keyed to its lower end for cooperation with a roller 603 on an actuating arm 604 of a switch Sw20. When either of the feeler arms 593 or 594 is contacted and pivoted by a stack of cases, the other feeler arm is also pivoted. Therefore, the switch Sw20 will be actuated each time a stack passes the linkage 590. A spring 605, connected between the arm 599 and the channel extension 64a, urges the linkage 590 to its inner position wherein an adjustable stop screw 606 abuts the channel extension.

Similarly, the linkage 591 (FIG. 17), which has pivotally mounted feeler arms 601 (FIG. 13A) interconnected by a bent rod 607, is arranged to actuate a switch Sw11 (FIG. 17) each time a stack of cases passes along the stack conveyor. Also, the linkage 592, having feeler arms 608 and 609, is arranged to actuate a switch Sw12 whenever a stack of cases on the stack conveyor comes in contact with the feeler arms.

A normally closed switch Sw18 shown in dotted lines (FIG. 17) is mounted on one of the case guide straps 210 near the end of the endless chain section of the stack conveyor. This switch Sw18 has an actuator arm 610 which is mounted for pivotal, swinging movement in either direction and extends into the path of movement of cases being advanced on the stack conveyor. When a stack of cases is advanced toward the roller section 191 of the stack conveyor, the stack will contact the arm 610 and swing it out of the path of the stack, thereby temporarily opening switch Sw18. When the entire stack clears the arm 610, the stack will be substantially all the way on the roller section 191 in front of the ram 25. Accordingly, the release of the switch arm 610 is an indication that the stack of cases is ready to be pushed onto the pallet at station 27.

A switch Sw17 is mounted on the transverse bottom angle bar 281 of the ram carriage frame (FIG. 17) and has an actuator arm 611 disposed in the path of movement of the rigid strap 257 which connects the sleeves 255 of the ram. When the ram reaches the pallet loading position shown in FIG. 17, the strap 257 contacts and actuates the switch Sw17.

When a pallet loaded with stacks of cases is moved onto the live roll section 291 (FIG. 20) of the pallet conveyor, the pallet contacts an upstanding paddle 612 (FIGS. 20 and 21) that is welded to a shaft 613. The shaft 613 is journalled for rotation in the two spaced walls 233 and 233a of the stack conveyor and has an end portion 613a (FIG. 17) projecting through the wall 233 to receive a cam 614. The cam 614 is arranged to pivot an actuator arm 615 of a switch Sw13. A spring 616, connected between a radial arm 617 secured to the shaft 613 and a bearing block 618, normally urges the shaft 613 in a counterclockwise direction (FIG. 17). With this arrangement, when a pallet hits the paddle 612, the paddle is pivoted downwardly to rotate the shaft 613 in a clockwise direction to actuate switch Sw13 as seen in FIG. 17. When the pallet is removed from against the paddle 612, the spring 616 will rotate the shaft 613 in a counterclockwise direction to return the paddle 612 to upright position and release switch Sw13.

If there are cases on the pallet P when it is in position against the paddle 612, one of the cases will engage and actuate a pair of switch arms 620 (FIGS. 20 and 21) which are mounted almost directly above the paddle 612 on a bracket 621. The arms 620 are arranged to actuate a switch Sw16 which is also mounted on the bracket 621.

A normally closed switch Sw22 (FIG. 20) is mounted on a bracket 623 which is secured to a guide bar 624 at the discharge conveyor end of the frame 237. The switch Sw22 has pivotally mounted actuator arms 625 which extend into the path of and are arranged to be pivoted by a pallet as it is discharged on the discharge conveyor 29.

Adjacent the end of the discharge conveyor 29, a switch Sw15 is mounted on the transverse end plate 283 of the support frame 237. An actuator 627 is disposed in the path of the crosshead 263 and is arranged to be contacted thereby when the ram is in position to start a pallet unloading operation.

While a pallet is being loaded at station 27, the movement of a stack of cases onto the pallet tends to move the pallet onto the discharge conveyor 29. Such movement of the pallet is prevented by a stop bar 630 (FIGS. 20 and 22). The stop bar 630 extends across the frame support structure 237 substantially parallel to the rollers 288 of the discharge conveyor and is rotatably mounted in short arms 631 (one only being shown) which projects upwardly from a transverse plate 632. The plate 632 is secured, adjacent its ends, to levers 634 that have hub portions 635 rotatably mounted on the transverse shaft 327. A pair of springs 638, each of which is connected between a downwardly projecting arm 639 of one of the levers 634 and a bolt 640 mounted on a transverse angle bar 641, tend to pivot the stop bar 630 and the plate 632 clockwise around shaft 327 to a raised position to block the movement of the pallet onto the discharge conveyor 29. A latch 643, which is pivotally mounted on a fixed bracket 644, is held in position under the transverse plate 632 by a spring 645 that urges the lath in a clockwise direction to a position against a stationary, adjustable stop 646. The latch 643 is swung in a counterclockwise direction, to release the plate 632, by a solenoid 647 that is mounted on the angle bar 641. With this arrangement, when the solenoid 647 is energized, the latch 643 is pivoted to release the plate 632, permitting the stop bar to drop to its lowered position. When the solenoid 647 is de-energized, the latch is returned to upright position under the plate 632 by the springs 638 and 645 and the spring-loaded plunger 647a of the solenoid.

One of the bars 325 of the parallelogram pallet lift mechanism 26 (FIG. 21) is arranged to contact a laterally projecting actuator arm 648 of a switch Sw19 to close the switch when the lift mechanism is moved to its lowered position. Similarly, the ramp 344 (FIG. 1) is arranged, upon being moved downwardly under the weight of the fork lift truck, to actuate a switch Sw21 which is mounted on the frame of the pallet conveyor.

A normally open switch Sw14 (FIGS. 20 and 21) is mounted on a bracket 649 that is supported from the transverse angle 304. The switch Sw14 has an actuator arm 649a disposed in the path of movement of an upstanding lug 649b secured to one of the longitudinal tie-rods 270 of the ram carriage. When the ram completes the loading of a pallet, the ram carriage is in a position wherein the lug 649b contacts the arm 649a and closes the switch Sw14 to effect the lowering of the pallet stop bar 630.

Operation

Since the hydraulic and electrical controls have now been fully explained, the several cycles of operation of the machine will be described with particular reference to the hydraulic and electric control diagrams, FIGS. 25 and 26, respectively.

*Pallet loading cycle.*—In the control diagram of FIG. 26, the vertical lines L1 and L2 represent leads connected to a source of 60 cycle, 3 phase, 220 volt, alternating current. The various auxiliary circuits, which control the operation of elements of the machine and the electrical relays of the circuits, are indicated as generally horizontal lines on the diagram and are numbered adjacent the marginal edge of the diagram as auxiliary control circuits 650 and 681, inclusive. Circuits 678 through 681 are supplied with direct current by the usual rectifier and transformer.

In the control diagram (FIG. 26), the switches are shown in their normal position, as they were wired by the switch manufacturer. It will be understood, however, that the linkage of the paddle 212 (FIG. 3) is initially adjusted so that, when the paddle is in its normal upper position, switch Sw5 is actuated to close the normally open contacts Sw5-1 in circuit 650 and open the normally closed contacts Sw5-2 in circuit 667. These initially adjusted positions are shown in dotted lines while the normal positions are shown in full lines. To start the pallet loading cycle, the selector switch Sw23 in circuit 657 is actuated to open contacts Sw23-1, Sw23-2 and Sw23-3 and close contact Sw23-4 in circuit 681. An empty pallet is then positioned at the pallet loading station to close the switch Sw13 in circuit 668, the parallelogram lift mechanism 26 is moved to its lowered position closing switch Sw19 in circuit 669, the fork carriage 67 is moved to its lowermost position closing switch Sw4 in circuit 665, and the ram 25 is moved to its loading position contacting switch Sw17, closing contact Sw17-1 in circuit 676 and opening contact Sw17-2 in circuit 677. A case counter switch Sw24 is connected in circuit 666 together with a selector switch Sw25. The counting switch Sw24 has three contacts Sw24-1, Sw24-2, and Sw24-3 which are arranged to be closed consecutively as the switch is actuated step-by-step each time the solenoid 682 in circuit 680 is energized. Contact Sw24-1 will be closed when four cases have been piled one on top of the other to form a stack. Similarly, contact Sw24-2 will be closed when five cases are in the stack and contact Sw24-3 will be closed when six cases are in the stack. Selector switch Sw25 has two contacts Sw25-1 and Sw25-2 which are selectively movable to connect one of the contacts Sw24-1, Sw24-2, or Sw24-3 in the circuit 666. In FIG. 26, contact Sw25-1 has been closed to connect contact Sw24-1 in circuit 666, whereby when four cases are in the stack the circuit will be closed.

When the master switch Sw26 is closed and lines L1 and L2 are energized, relay E in circuit 668, relay F in circuit 669, relay T in circuit 665, and relay D in circuit 676 are energized. When photo-relay unit Sw7 in circuit 677 is first energized, normally closed contact Sw7-1 opens. As soon as the photo relay has had time to warm up and is functioning correctly, contact Sw7-1 closes. The start button 683 may then be closed whereby relay M is energized and pump motor starting coil SC-684 is energized to start the pump motor. When relay M is energized contact M1 in circuit 650 is closed causing the motor starting coil SC-685 of the feed conveyor motor 37 to be energized to start the motor for moving the first full case into the stacker. Energizing relay M also closes contact M2 in circuit 655 whereby solenoid 559, which controls the case stop bar 552, is energized to depress the bar 552. When the first case passes over the stop bar 552 and enters the stacker, it contacts the stop bar 530 which actuates and closes switch Sw1 in circuit 655 whereby circuit 655 is closed, since contacts F1 and T1 were previously closed by the energization of relays F and T, respectively. When circuit 655 is closed, relay V is energized and locked in through contact V3. Contact V1 in circuit 655 is opened, de-energizing solenoid 559 and causing the stop bar 552 to be raised in front of the boxes on the accelerator conveyor 21, contact V2 in circuit 661 is closed, energizing the fork elevating solenoid 396, and contact V4 in circuit 663 is opened, de-energizing the fork lowering solenoid 395. The opening of contact V4 also de-energizes the solenoids 134 of the case-supporting blades 115 in circuit 664 which control the case-supporting blades 115.

When the fork 30 moves upwardly to carry the first case up into the stacker, switch Sw1 in circuit 655 and switch Sw4 in circuit 665 are opened. In its upward movement, the fork carriage contacts and momentarily closes switch Sw2 in D.C. circuit 680 to energize solenoid 682 and close a contact of counting switch Sw24 in circuit 666. In the first upward movement of the fork, the first case is carried upwardly past the de-energized case-supporting blades 115 until the fork carriage reaches the top of its stroke where it contacts and opens switch Sw3 in circuit 653. When switch Sw3 is opened, the holding circuit through contact V3 is opened and relay V is de-energized, causing contact V2 in circuit 661 to be opened whereby the fork elevating solenoid 396 is de-energized. The de-energization of relay V also returns contact V4 in circuit 663 to closed condition, thereby to energize the fork lowering solenoid 395 and permit the fork to move downwardly by gravity, permitting switch Sw3 to close. The closing of contact V4 in circuit 664 causes solenoids 134 to be energized and the blades 115 to be projected inwardly into the path of the case being lowered by the fork. The case is deposited on the blades and the fork continues its downward movement.

When the fork carriage reaches its lowermost position, it closes the switch Sw4 in circuit 665 once again whereby relay T is energized to close contact T2 in circuit 655. When circuit 655 is closed, the solenoid 556 is energized and the stop bar 552 pulled down to permit the second case to be moved into the stacker by the accelerator conveyor 21. The second case contacts stop bar 530 which again closes switch Sw1 to energize relay V and start another case elevating cycle. The cycle is repeated until the desired number of cases has been counted by actuation of the step switch Sw2, as described hereinbefore.

When the fourth case has been counted and circuit 666 has been completely closed by the contact Sw24-1, relay C is energized and locked in through contacts C2 and A4 whereby contact C1 in circuit 655 is opened to open the holding circuit through V3 and de-energize relay V. Contact V2 in circuit 661 is thus opened and the fork elevating solenoid 396 is de-energized. Contact C4 in circuits 663 and 664 is opened to open both of these circuits and keep the fork lowering solenoid 395 de-energized and the blade solenoids 134 de-energized. With both the fork elevating solenoid and the fork lowering solenoid de-energized, the valves VA and VB assume the centered positions shown in FIG. 25 and the pressurized fluid in line 500—501 is directed through the U-shaped passage 412 to the reservoir 422. The fork power cylinder 93 is drained to reservoir 422 through the needle valve 525 in line 527, and through line 501, passage 412 and line 502—467 thereby permitting a slow descent of the fork and the stack of cases loaded thereon.

When the fork deposits the stack of cases on the accelerator conveyor 21, the spring mounted center section of the conveyor moves downwardly to set the stack on the chains of the stack conveyor section 190. In its downward movement the center section of the accelerator conveyor contacts switch Sw5 opening contact Sw5-1 in circuit 650 to de-energize the starter coil SC-685 of the accelerator conveyor motor 37, and closing contact Sw5-2 in circuit 667 to energize relay R. When relay R is energized, contact R1 in circuit 652 is closed to energize relay A which closes contact A1 in D.C. circuit 678 to energize solenoid 686 which is arranged to reset the case counter step switch Sw24. With relay A energized, contact A3 in circuit 661 is opened to prevent the fork elevating solenoid 396 from being energized and contact A2 in circuit 655 is opened to prevent the energization of relay V. At this time, stack conveyor section 190 is in operation since the starter coil SC-687 in circuit 662, which causes movement of the conveyor surface away from the stacker unit, was energized by the previous energization of relays M and D, whereby contacts M3 and D2 in circuit 662 were closed. Therefore, when the stack of cases is deposited on the stack conveyor chain section 190, it is immediately carried away from the stacker unit. As the stack leaves the unit, the spring mounted center section of the accelerator conveyor is moved upwardly away from Sw5, permitting the contact Sw5-1 in circuit 650 to close and energize starting coil SC-685 of the feed and accelerator conveyor motor 37, and permitting the contacts Sw5-2 in circuit 667 to open to de-energize relay R. When relay R is de-energized, contact R1 in circuit 652 is opened to de-energize relay A, whereby contact A3 in circuit 661 is closed to ready the fork elevating solenoid 396 and contact A2 is closed to ready the circuit 655 in which switch Sw1 and relay V are connected. Thus, the formation of a second stack is ready to begin as soon as the first stack leaves the stacker unit.

The first stack is conveyed along the stack conveyor section 190 past switches Sw20, Sw18, Sw11, and Sw12 to come to rest against stops 24. When the second stack is formed, it is likewise conveyed along the stack conveyor and comes to rest in position to hold switch Sw12 in circuit 674 closed. When the third stack, moving along the stack conveyor, clears switch Sw18 in circuit 673, and actuates switch Sw11 to close contact Sw11-2 in circuit 674, relay N is energized through circuit 674 which includes closed contact Sw11-2, closed switch Sw12, closed contact S6 and E2, closed switch Sw18, closed contact K4 and close contact Sw15-2. Relay N is then locked in through contact N3 in circuit 675. The closing of contact N2 in circuit 671 energizes the pallet loading solenoid 439 to start the ram 25 in the direction to push the line of stacks onto the empty pallet positioned at the loading station 27. At the same time, the opening of contact N1 in circuit 670 prevents the energization of the pallet unloading solenoid 438 during this movement of the ram 25. It will be noted in FIG. 25 that, even though the pallet loading solenoid 439 is energized, no fluid will be directed through line 506 to valve VD unless fork lowering solenoid 395 has also been energized to shift valve VB to the position in which fluid from supply line 500 is directed to line 506. Since the fork lowering solenoid 395 is energized only when the fork carriage is being lowered or when the fork carriage is at the bottom of its stroke waiting for a case to be fed into the stacker unit, it will be evident that the ram 25 will not start its pallet loading movement until the fork carriage is in one of these two positions. It will, therefore, be seen that the stacking operation is never halted by the action of the loading ram, since it has priority on the use of the pressurized fluid in supply line 500. It will also be noted in FIG. 25 that, when pallet loading solenoid 439 is energized, fluid from line 506 is directed through passage 453 and line 510 to the pallet loading side of cylinder 266 and to the lowering side of cylinder 335. Since the parallelogram lift mechanism 26, which is controlled by cylinder 335, is already down at this time, the fluid will immediately go to the ram cylinder 266, to move it in the pallet loading direction.

When the ram 25 starts forward in its pallet loading stroke, it releases switch Sw17 permitting contact Sw17-1 in circuit 676 to open and de-energize relay D. Contact D2 in circuit 662 is opened and starting coil SC–687 is de-energized and the stack conveyor is stopped. When the ram 25 moves the first line of stacks completely onto the pallet, the ram carriage closes switch Sw14 in circuit 671 to energize relay K which is then locked in through contact K2 of circuit 672. When relay K is energized, contact K3 of circuit 671 is opened de-energizing the pallet loading solenoid 439, and contact K4 in circuit 675 is opened de-energizing relay N. When relay N is deenergized, contact N1 in circuit 670 returns to closed position to energize the pallet unloading solenoid 438 and start the ram on its return stroke. When the ram contacts switch Sw17 to close contact Sw17–1 in circuit 676, relay D is again energized whereby contact D4 in circuit 670 is opened stopping the ram, and contact D2 in circuit 662 is closed to re-energize starting coil SC–687 and start the stack conveyor once more.

When the second line of three stacks of cases is formed on the stack conveyor in front of the ram 25, switch contact Sw11 and Sw12 in circuit 674 are closed to energize relay B through contact K1 which was closed when relay K was energized and locked in through holding circuit 672. With relay B energized, contact B3 in circuit 674 is closed, re-energizing relay N through switch Sw18.

Contact B4 in circuit 672 is released, unlocking relay K. Relay N is again locked in through contact N3 in circuit 675, contact N2 in circuit 671 is closed, the pallet loading solenoid 439 is energized and the pallet loading movement of the ram 25 is again started. Relay B is also locked in through switch Sw18 and circuit 675. The ram pushes the second line of stacks against the first line of stacks already on the pallet and continues pushing both lines across the pallet until the back edge of the second line is flush with the rear edge of the pallet. At this time the ram carriage contacts and closes Sw14 in circuit 671. Since relay B is energized, contact B1 in circuit 671 is closed and, since relay D in circuit 676 was de-energized when the ram moved away from switch Sw17, contact D3 in circuit 671 is also closed. Accordingly, the solenoids 647, which control the pallet stop bar 630, are energized so that the bar may drop down to permit discharge of the loaded pallet. It will be noted that since relay B is energized, contact B4 in circuit 672 is open, and, therefore, relay K is not energized this time when switch Sw14 is closed. As a result the pallet loading solenoid 439 is not de-energized and the ram continues in the pallet loading direction. The latch 272 (FIG. 1) on the ram engages the loaded pallet and shifts it onto the gravity discharge conveyor 29. The ram continues pushing until the ram carriage contacts and opens switch Sw15 in holding circuit 675 to de-energize relays N and B. When relay N is de-energized, contact N2 in circuit 671 is opened and the pallet loading solenoid 439 is de-energized to stop the movement of the ram. At the same time, contact N1 in circuit 670 is returned to closed position to energize the pallet unloading solenoid 438 and start the return movement of the ram to its position against switch Sw17.

If a second pallet is loaded and pushed onto the gravity discharge conveyor 29 before the first loaded pallet is removed from that conveyor, the second loaded pallet will come to rest in a position holding the switch Sw22 in circuit 677 to open position. Then, when the ram 25 returns to its initial position against switch Sw17, circuit 677 will be opened and relay M de-energized to stop all the motors, except the pump motor, of the machine.

*Pallet unloading cycle.*—Before the start of the pallet unloading cycle, the master disconnect switch Sw26 is open, and all switches and contacts are in the positions shown in FIG. 26. To start the cycle, the selector switch Sw23 is actuated to close switch contact Sw23–1 and Sw23–3 and open contact Sw23–2 in circuit 656 and open contact Sw23–4 in D.C. circuit 681. The ram 25 is then moved to the unload position adjacent the discharge conveyor 29 as shown in FIG. 26 by using a jog button 690 in circuit 675. In this position, the ram carriage holds open the switch Sw15 in circuit 672. The fork carriage 67 is in its lower position to close switch Sw4 in circuit 665, and the parallelogram lift mechanism 26 is lowered to close switch Sw19 in circuit 669. Accordingly, when the master switch Sw26 is closed to energize lines L1 and L2, relay T in circuit 665 and relay F in circuit 669 are immediately energized. Also, in circuit 656 relay S is energized. Contact S15 in circuit 660 is closed, energizing relay P and closing contact P3 in circuit 651 whereby solenoid 551 is energized to unlatch the stop bar 530 permitting it to drop. When the photo cell contact Sw7–1 in circuit 677 is closed and the start switch 683 is closed, relay M is energized and pump motor starting coil SC–684 is energized and locked in through contact SC–684–1. When relay M is energized, contact M1 in circuit 650 closes to energize starting coil SC–685 of the case feeding conveyor motor 37, and contacts M3 and M4 in circuit 662 close to energize the starting coil SC–688 which rotates the stack conveyor motor 203 in a direction to cause the stack conveyor to carry stacks of cases toward the unstacker unit 22. Also, when contact M3 is closed the starting coil SC–689 of the pallet conveyor motor 295 is energized to start the pallet conveyor 28, preparatory to moving a pallet loaded with cases of empty bottles toward the unloading station 27. At this time, the solenoids 134, which control the case-supporting blades 115 and which are connected in circuit 664, are de-energized due to the opening of contact S13. When the fork lift truck runs up the ramp 344 (FIG. 1) to deposit the loaded pallet on the pallet conveyor 28, the ramp swings downwardly and opens switch Sw21 in circuit 662, causing the pallet conveyor motor starting coil SC-689 to be temporarily de-energized and stopping the conveyor while the loaded pallet is placed thereon. After the pallet is deposited on the conveyor and the fork truck is backed off the ramp, the switch Sw21 closes and the conveyor starts up and carries the loaded pallet toward the pallet unloading station 27. When the pallet reaches the unloading station 27, the pallet contacts and closes switch Sw13 in circuit 668 to energize relay E. Contact E1 in circuit 662 is opened, de-energizing the starting coil SC-689 of the pallet conveyor motor 320. Contact E3 in circuit 670 is closed, energizing the pallet unloading solenoid 438 to shift valves VC and VD and direct fluid into line 522 (FIG. 25). Also, as the loaded pallet reached the stack unloading station 27, the cases on the loaded pallet engaged and closed switch Sw16 in circuit 658, closing circuit 658 and energizing shut off valve solenoid 520 which, as seen in FIG. 25, opens the valve 519 and permits flow of fluid from line 522 to the power cylinder 335 of the lift mechanism 26 to raise the lift mechanism and elevate the loaded pallet to the level of the stack conveyor live roll section 191. As the lift mechanism 26 moves upwardly, switch Sw19 in circuit 669 is opened and relay F is de-energized. Contact F2 in circuit 662 is opened and the stack conveyor motor starting coil SC-688 is de-energized. When the lift mechanism 26 is fully raised, the internally controlled sequence valve 516 (FIG. 25) ports fluid into line 523 to be directed to the unload side of the ram power cylinder 266. This causes the ram to move toward the stack conveyor, pushing the load of cases along in front of it until the line of stacks closest to the stack conveyor is positioned on the stack conveyor in contact with and closing switches Sw11 and Sw12 in circuit 674, whereby to energize relay N through contact S10. Contact N1 in circuit 670 opens, de-energizing the pallet unload solenoid 438 and stopping the unloading movement of the ram. Contact N2 in circuit 671 closes, energizing the pallet loading solenoid 439 to cause the ram to return to its unload position adjacent the gravity discharge conveyor 29 where it contacts and opens switch Sw15 in circuit 675. However, relay N remains energized since circuit 675 is still closed through contact F4. When the ram reaches its unload position, fluid pressure builds up in line 512 and 513 (FIG. 25) causing the externally controlled sequence valve 515 to change its setting and permit the piston in the lift cylinder 335 to travel in the down direction by pushing fluid backwardly through the sequence valve 515. The lift mechanism 26 is lowered, contacting and closing switch Sw19. When switch Sw19 in circuit 669 is closed, relay F is energized. Contact F2 in circuit 662 is closed, re-energizing the stack conveyor starting coil SC-688 and contact F4 in circuit 675 is opened, de-energizing relay N. When relay N is de-energized, contact N2 in circuit 671 opens, de-energizing the pallet loading solenoid 439.

The line of stacks on the stack conveyor is conveyed toward the unstacker, the chain section 190 traveling at a faster rate than the live roll section 191 to open a gap between successive stacks. The first stack of cases depresses the paddle 212 causing the center portion of the accelerator conveyor to be depressed and causing switch Sw5 to be actuated to open contact Sw5-1 in circuit 650 whereby to de-energize starting coil SC-685 to stop the accelerator conveyor motor 37, and to close contact Sw5-2 in circuit 667 whereby to energize relay R. Contact R1 in circuit 652 is closed, energizing relays A and X. The stack continues on into the unstacker to break the light beam of photo relay Sw7. The photo relay Sw7 is of the time delay type so arranged that the stack will continue on into position in the stacker before relay Sw7 is actuated. Actuation of Sw7 opens contacts Sw7-2 in circuit 662 whereby the stack conveyor motor coil SC-688 is de-energized. Actuation of Sw7 closes contact Sw7-3 in circuit 658 and contact Sw7-4 in circuit 655 to energize relay V, which is locked in through contact V3 and switch Sw3. Contact V4 in circuit 663 is opened, de-energizing the fork lowering solenoid 395, while contact V2 in circuit 661 is closed to energize the fork elevating solenoid 396.

As the fork starts to elevate the stack of cases, the fork carriage permits the switch Sw4 to open, and the center section of the accelerator conveyor moves upwardly permitting switch Sw5 to be actuated to open contact Sw5-2 in circuit 667, de-energizing relay R, and to close contact Sw5-1 in circuit 650, energizing the starting coil SC-685 of the accelerator conveyor motor 37 and starting the accelerator conveyor. At the top of its stroke the fork carriage opens switch Sw3 in circuit 653, thereby de-energizing relay X and relay V in circuit 655. De-energizing relay V, opens contact V2 in circuit 661, de-energizing the fork elevating solenoid 396 and causing the fork to slowly descend, the fluid in line 505 (FIG. 25) being directed through the restricted opening of the needle valve 525.

In its lowering movement the fork carriage contacts and closes switch Sw8 in circuit 664, whereby the blade solenoids 134 are energized to project the blades 115 inwardly into the path of the descending stack of cases. The switch Sw8 is so located that it is actuated after the lowermost case of the stack is below the blades 115. With this arrangement, the blades 115 will arrest the downward movement of the rest of the stack while permitting the lowermost case to descend with the fork. As the fork continues downwardly switch Sw8 is released and permitted to open, de-energizing the blade solenoids. The weight of the stack of cases will hold the blades in position under the stack.

When the fork carriage reaches its lower position, it deposits the case on the accelerator conveyor and closes switch Sw4 in circuit 665, energizing relay T. Contact T1 in circuit 655 closes, energizing relay V. The accelerator conveyor removes the case from the unstacker. As the case leaves the unstacker, it actuates switch Sw9 closing contact Sw9-1 in circuit 654, to energize relay X, which locks in through contact X1 in circuit 653, and opening contact Sw9-2 in circuit 655 to temporarily de-energize relay V. When the case is clear of the unstacker, it releases switch Sw9 permitting contact Sw9-1 in circuit 654 to open and contact Sw9-2 in circuit 655 to close. Since the light beam of photo cell Sw7 is still broken by the stack of cases in the unstacker, contact Sw7-4 in circuit 655 is still closed. Accordingly, relay V is again energized when contact Sw9-2 in circuit 655 is returned to closed position. When relay V and relay X are both energized, the case releasing and discharging cycle is repeated until all the cases are one by one discharged from the unstacker.

When the last case leaves the unstacker and switch Sw9 is allowed to return to normal position, relay V is not energized because the light beam of photo relay Sw7 is no longer broken and contact Sw7-4 in circuit 655 is open. Accordingly, the fork carriage remains in its lower position. When the light beam of photo relay Sw7 is no longer broken, contact Sw7-2 in circuit 662 is closed to re-energize the stack conveyor motor starting coil SC-688 and start the stack conveyor to bring another stack into the unstacker. This unstacking operation continues as long as stacks are supplied on the stack conveyor.

When the last of the three stacks of cases of the first line of stacks has been advanced along the stacker conveyor toward the unstacker unit to a point where switch Sw11 is released and the contact Sw11–1 in circuit 670 returns to its closed position, the pallet unloading solenoid 438 is again energized. Through the same sequence of operations as before, the last line of stacks remaining on the pallet is pushed over onto the stack conveyor live roll section by the ram, and the ram is returned to its unload position near the gravity discharge conveyor 29. When the last of the three stacks of the last line of stacks is advanced along the stack conveyor to a point where it clears switch Sw11, contact Sw11–1 in circuit 670 is closed and the unload solenoid 438 is again energized causing the ram to be moved toward the stack conveyor. It does not stop this time until it arrives in the load position in contact with and opening switch Sw17. When the last three stacks were pushed over onto the stack conveyor live roll section 191, switch Sw16 in circuit 658 was allowed to open and de-energize solenoid 520 (FIG. 25) controlling the hydraulic shut-off valve 519, whereby the valve 519 closes. This valve, in closing, prevented cylinder 335 from being actuated when unload solenoid 438 was energized and pallet lift mechanism remains in down position until valve 519 is again opened by energizing solenoid 520. When the ram 25 closes contact Sw17–1 in circuit 676, relay D is energized which, through contact D4 in circuit 670, de-energizes the pallet unload solenoid 438.

If it is then desired to unload another pallet load, the jog button 690 in circuit 675 must be manually closed to energize relay N which locks in through contact N3. Contact N2 in circuit 671 is closed to energize the pallet load solenoid 439, whereby the ram is returned to its unload position to contact and open switch Sw15. During the return movement of the ram, the latch 272 engages the empty pallet and pushes it onto the gravity discharge conveyor 29. The opening of Sw15 de-energizes relay N, contact N1 in circuit 670 is opened and pallet unload solenoid is de-energized. The machine is now ready to receive another pallet load of cases of empty bottles.

*Automatic pallet loading and unloading cycle.*—The machine of FIG. 1 can be operated as a combination pallet loader and unloader. When operated in this manner, the machine operates through one complete cycle, either a loading cycle or an unloading cycle, and then shifts over to the other cycle. Thus, if the machine is set to operate first as an unloader, a pallet loaded with stacks of cases of empty bottles will be moved by the pallet conveyor 28 to station 27 where the ram shifts the stacks onto the stack conveyor 23 for movement into the stacker-unstacker unit 22. The empty pallet remains at station 27 and, as soon as the last case of empty bottles is unstacked, full cases are brought in by the accelerator conveyor 21, formed into stacks in the stacker-unstacker unit 22, and positioned on the empty pallet by the stack conveyor and the ram 25. When the pallet is loaded, it is pushed onto the gravity discharge conveyor 29 by the ram 25 which is then in position to unload the next pallet of cases of empty bottles when it is moved to station 27 by the pallet conveyor 28.

If it is desired to start the automatic operation on the unloading cycle, the selector switch Sw23 in circuit 657 (FIG. 26) is set at "automatic," moving the contacts Sw23–1 and Sw23–2 to closed position and contacts Sw23–3 and Sw23–4 to open position. Then, with the ram 25 in unload position closing switch Sw15 in circuit 672, and with the fork carriage 67 in its lowered position closing switch Sw4 in circuit 665, the master switch Sw26 is closed. Since the lift mechanism 26 is in its lowered position closing switch Sw19 in circuit 669, and the photo relay Sw7 is on, the unstacking cycle begins. As described above, the machine finishes the unloading cycle with the ram carriage in load position closing the contacts Sw17–1 of the switch Sw17 in circuit 676 causing relay D to be energized, an empty pallet at station 27 closes switch Sw13 in circuit 668, the pallet lift mechanism 26 is in lowered position closing switch Sw19 in circuit 669, and the fork carriage 67 is in its lowered position closing switch Sw4 in circuit 665. Also, at the end of the unload cycle, contacts of relay S in circuits 656, 657, 658, and 659 are de-energized because contact D1 in circuit 656 is open, switch Sw20 in circuit 657 is opened, contact Sw7–3 of photo relay Sw7 in circuit 658 is open, and contact R1 in circuit 652 is open. With all these conditions present, the machine automatically starts the loading cycle.

During the loading cycle, each stack of cases is counted when it is deposited on the stack conveyor 23 by the fork 30. The counting is carried out by a stack counter unit Sw27 in circuit 660. This stack counter is actuated in steps, one step being taken each time contact A7 in D.C. circuit 679 is closed by solenoid 687 as a result of a newly formed stack depressing the cradle 53 of the accelerator conveyor 21 to close contacts Sw5–2 in circuit 667 whereby to energize relay R, close contact R1 in circuit 652 and energize relay A. When a predetermined desired number of stacks have been deposited on the conveyor, the solenoid closes the contacts Sw27–1 in circuit 660 to stop the stacking operation. Assuming six stacks of cases are to be loaded on the pallet, when the sixth stack actuates the switch Sw5 to close contact Sw5–2 in circuit 667, solenoid 687 closes contact Sw27–1 in circuit 660 energizing relay P. Contact P1 in circuit 655 is opened, de-energizing case stop solenoid 559, permitting the stop bar 552 to be locked in the up position to stop the further movement of full cases. Also, contact P4 in circuit 661 is opened to prevent energization of the fork elevating solenoid 396. The raising of the stop bar 552 and the de-activation of the fork 30 effectively prevents further operation of the unit 22 as a stacker. Then when the last stack of cases is conveyed out of the unit 22 on the stack conveyor 23 to clear switch Sw5, contact Sw5–2 in circuit 667 returns to open position de-energizing relay R, opening contact R1 in circuit 652 and de-energizing relay A. When the ram pushes the last line of stacks onto the pallet, the ram carriage contacts switch Sw15 to close contact Sw15–1 in circuit 656 and energize the relay S. As previously explained, closing relay S when relay P is energized, starts the unload cycle.

It will be noted that during the unload cycle, when the first case leaving the unstacker unit 22 trips switch Sw9, contacts Sw9–1 in circuit 654 are closed, energizing relay X, and closing contact X4 in D.C. circuit 681 to energize a solenoid 691 which is arranged upon energization, to reset the stack counter stepping switch Sw27.

Other arrangements of the article conveying and handling apparatus of the present invention are disclosed in the previously mentioned parent application Serial No. 521,011. For a detailed description of these embodiments, reference may be had to said application.

From the foregoing description it will be seen that the present invention provides an apparatus for rapidly and efficiently loading cases on a pallet or removing cases from a pallet. The speed of operation is attained through the unitary movement of an entire line of stacks of cases from a pallet to a conveyor and vice versa, and by the inter-related automatic control arrangements which start each step in the loading and unloading operation immediately after the preceding step has been completed. In the unloading operation, each line of stacks is shifted from the pallet to the stack conveyor as soon as the previously delivered line has been shifted along the stack conveyor a distance sufficient to permit the positioning of the new line on the stack conveyor. Also, each stack is moved into the unstacking unit as soon as the last case of the preceding stack leaves the unstacking unit. Similarly, in the pallet loading machine, the formation of the second stack of cases is begun immediately after the first stack leaves the stacker unit. Also, a new line of stacks is formed in front of the ram, as soon as the preceding line of stacks has been shifted onto the pallet. The use of an accelerator conveyor to form gaps between adjacent cases and stacks of cases, and the use of a power driven ram to move the stacks between the pallet and the stack conveyor assure a rapid and efficient loading and unloading operation.

Having thus described our invention, what we claim as new and desire to protect by Letters Patent is:

1. Apparatus for handling cases or the like comprising a case unstacking machine adapted to receive a stack of cases, elevate the stack and lower the cases one by one from the stack, a case discharge conveyor having a conveying section extending into said machine and arranged to receive each case lowered by said unstacking machine and carry the case out of the machine, means mounting said conveying section for vertical movement from an elevated to a depressed position, a stack delivery conveyor having a conveying surface extending into said unstacking machine at a level between the elevated position and the depressed position of said conveying section, a lever operatively connected to said vertically movable conveying section and movable in a pivotal direction to depress said conveying section, and means mounting said lever in the path of a stack of cases being advanced on said stack conveyor to be contacted and pivoted by the stack to depress said conveying section below the conveying surface of said stack conveyor, permitting entrance of the stack into the unstacking machine.

2. Apparatus for handling cases or the like comprising a support structure, elevating means mounted for vertical reciprocation in said support structure and arranged to lift a case upwardly in said structure during a stack forming operation, a pair of spaced support blades mounted on said structure and disposed on opposite sides of the path of upward movement of a case being raised by said elevating means, means mounting said blades for movement from a position in the path of a case being raised or lowered by said elevating means to a position removed from said path, and power means for urging said blades into said path obstructing position including a lever system connected to each blade, a solenoid secured to said support structure and operatively connected to said system and arranged when energized to pivot said lever system and urge the associated blade into said path obstructing position, and a spring connected between said solenoid and said lever system for transmitting the force of said solenoid to said lever system.

3. Apparatus for handling cases or the like comprising a support structure, a pair of case-supporting blades pivotally mounted in spaced, horizontal alignment, a case elevating fork mounted for vertical reciprocation on said structure from an elevated to a lowered position and arranged to carry a case upwardly between said spaced blades, a conveyor having a conveying surface including spaced rollers disposed parallel to the tines of said fork, each tine being disposed between adjacent rollers of said conveyor when said fork is in lowered position, said conveyor being operatively associated with said fork for moving a case into position over said fork when said fork is in a lowered position, first power means for actuating said conveyor, second power means for raising said fork, and control means operatively connected to said first and second power means and responsive to the positioning of a case over said fork to de-energize said first power means to stop said conveyor and energize said second power means to move said fork upwardly.

4. Apparatus for handling cases or the like comprising a machine adapted to form a stack of cases during a cycle of operation, means for delivering cases into said machine during the stacking cycle, a conveyor operatively associated with said machine for receiving each stack of cases and conveying the stack away from said machine, power means for driving said machine through said case stacking cycle, a control circuit operatively associated with said power means for controlling the sequence of operations of said stacking cycle including the delivery of successive cases to the machine, and switch means in said control circuit responsive to the depositing of a stack on said conveyor for stopping said stacking cycle and responsive to the departure of said stack from said machine for energizing said case delivery means to move a case into the machine to re-initiate said cycle.

References Cited in the file of this patent

UNITED STATES PATENTS

| | | |
|---|---|---|
| 1,132,840 | Garrett | Mar. 23, 1915 |
| 2,609,111 | Daves | Sept. 2, 1952 |
| 2,629,503 | Neja | Feb. 24, 1953 |
| 2,639,827 | Otte | May 26, 1953 |
| 2,687,813 | Verrinder | Aug. 31, 1954 |
| 2,701,650 | Stevenson | Feb. 8, 1955 |
| 2,768,756 | Horman | Oct. 30, 1956 |
| 2,802,583 | Dansereau | Aug. 13, 1957 |
| 2,829,759 | Parker | Apr. 8, 1958 |
| 2,885,097 | Lyon | May 5, 1959 |